United States Patent
Hirasawa et al.

[11] Patent Number: 5,949,586
[45] Date of Patent: Sep. 7, 1999

[54] LENS CONTROL DEVICE

[75] Inventors: Masahide Hirasawa, Sagamihara; Toshimichi Ouchi, Yokohama, both of Japan

[73] Assignee: Canon Kabushiki Kaisha, Tokyo, Japan

[21] Appl. No.: 08/833,952

[22] Filed: Apr. 3, 1997

Related U.S. Application Data

[63] Continuation of application No. 08/270,803, Jul. 5, 1994, Pat. No. 5,638,217, which is a continuation of application No. 07/932,301, Aug. 19, 1992, abandoned.

[30] Foreign Application Priority Data

| Aug. 20, 1991 | [JP] | Japan | 3-207636 |
| Aug. 20, 1991 | [JP] | Japan | 3-207637 |
| Aug. 20, 1991 | [JP] | Japan | 3-207644 |
| Aug. 20, 1991 | [JP] | Japan | 3-207645 |
| Aug. 21, 1991 | [JP] | Japan | 3-208386 |
| Aug. 21, 1991 | [JP] | Japan | 3-208387 |

[51] Int. Cl.$^6$ ................................. G02B 15/14
[52] U.S. Cl. ............................ 359/698; 359/700
[58] Field of Search .................. 359/698, 699, 359/700; 354/400, 402

[56] References Cited

U.S. PATENT DOCUMENTS

| 4,920,369 | 4/1990 | Kaneda et al. | 354/400 |
| 5,144,491 | 9/1992 | Ushiro et al. | 359/697 |
| 5,200,860 | 4/1993 | Hirasawa et al. | 359/696 |
| 5,202,992 | 4/1993 | Banno et al. | 359/676 |
| 5,287,223 | 2/1994 | Hirasawa | 359/697 |
| 5,369,461 | 11/1994 | Hirasawa et al. | 354/402 |
| 5,438,190 | 8/1995 | Kaneda et al. | 250/201.3 |
| 5,604,560 | 2/1997 | Kaneda | 396/133 |
| 5,629,735 | 5/1997 | Kaneda et al. | 348/350 |

*Primary Examiner*—Georgia Epps
*Assistant Examiner*—Suzanne Letendre
*Attorney, Agent, or Firm*—Robin, Blecker & Daley

[57] ABSTRACT

A lens control device for an inner focus lens system has a first lens group for zooming; a second lens group for focusing; a first zooming unit for controlling the second lens group for correcting the displacement of the focal plane resulting from the movement of the first lens group; a memory for memorizing the relative position of the second lens group to the first lens group in a zooming operation by the first zooming unit; a calculation unit for calculating the moving speed of the second lens group based on the memorized data, in order to maintain the focused in the course of movement of the first lens group; and a second zooming unit for controlling the second lens group according to the result of calculation. In this configuration, the positions of the focusing lens is memorized in a zooming operation from the telephoto side to the wide angle side, and, in the zooming operation from the wide angle side to the telephoto side, which is apt to generate a defocus, the focusing lens is controlled by the memorized data, in order to avoid generation of such defocus.

33 Claims, 15 Drawing Sheets

◄──── POSITION OF ZOOM LENS ────►

LENS CONTROL DEVICE

This application is a continuation of application Ser. No. 08/270,803, now U.S. Pat. No. 5,638,217 filed Jul. 5, 1994, which is a continuation of Ser. No. 07/932,301, filed Aug. 19, 1992, abandoned.

BACKGROUND OF THE INVENTION

1. Field of the Invention

The present invention relates to a lens control device for use in a camera.

2. Related Background Art

The cam-corders (VTR) have recently gained remarkable popularity, and, with their progress in the reduction of size and weight, the space and weight occupied by the lens and the automatic focusing device are rapidly decreasing.

In such trend, the automatic focusing device is shifting from so-called active type, having an emitter and a sensor for infrared light, to the passive type which detects the focus position from the image signal obtained from the image sensor.

On the other hand, in the lens unit, there is being widely introduced the lens of so-called inner focus type, in which a lens for correcting the displacement of focal plane resulting from zooming also serves for focusing, and the front lens is fixed for achieving compactization.

FIG. 1 shows an example of such inner focus type lens, wherein shown are a first fixed lens group 101, a second lens group 102 for zooming, a diaphragm 103, a third fixed lens group 104, a fourth lens group 105 for correcting the displacement of focal plane resulting from zooming and for focusing (focusing lens or compensator lens), an image sensor 106, and an image receiving face 106a thereof.

FIG. 2 shows the relationship between the focal length or the position of the zooming lens 102 and the position of the focusing lens 105 for focusing to different object distances. When the focal length is fixed, namely when the zooming lens 102 is stopped, the focusing can be achieved by moving the focusing lens 105 parallel to the ordinate at a horizontal position corresponding to the focal length. Also in the course of a zooming operation, an image signal without image blur can be obtained by selecting a trajectory of the focusing lens 105 from FIG. 2 according to the object distance and driving the focusing lens 105 according to said trajectory and corresponding to the change in the focal length, thereby simultaneously effecting the correction on the displacement of focal plane resulting from zooming and the focusing.

FIG. 3 shows an example of the control method for said focusing lens 105 in the course of a zooming operation. The axes are same as those in FIG. 2. The trajectories shown in FIG. 2 are divided into plural areas according to the zooming lens position (focal length) and the focusing lens position (object distance), and the representative speed of the focusing lens is indicated in each area. Arrows with varying angles indicate the speed of the focusing lens 105.

In FIG. 3, the moving range (abscissa) of the zooming lens 102 is divided into 16 equal zones, and the lens driving speed is defined in each of said zones. Said 16 equal zones will be hereinafter called zoom zones. By cutting the curves in FIG. 2 with said zoom zones, there are obtained sections of an almost same inclination in each zoom zone. In case the driving speed of the zooming lens, or the zooming speed, is constant, a same moving speed of the focusing lens 105 can be employed for different object distances if the speed or inclination of the focusing lens in each zoom zone is constant. Thus, each zoom zone is divided into portions of same inclination, as shown in FIG. 3, and a representative speed is given to each portion.

Thus, if the lens is focused at the start of zooming, it is rendered possible to cause the focusing lens 105 to follow the trajectory shown in FIG. 2 with an appropriate moving speed, by detecting the positions of the zooming lens and the focusing lens thereby determining the standard moving speed of said focusing lens, and applying correction by the focusing information from the auto focusing device.

However, let us consider a situation where the zooming lens 102 is positioned at the wide angle end in FIG. 2 and the focusing lens 105 is located close to a position P for focusing to an object at infinity. As will be apparent from FIG. 2, the cam trajectories for different object distances at the wide angle end are concentrated around a point A, and the focusing lens positions for infinity and for 3 meters may be contained in the depth of focus, depending on the lens and on the diaphragm aperture. Stated differently, in the zooming operation from the telephoto side to the wide angle side, the unfocused state does not occur easily because the trajectories are concentrated, but in the zooming operation from the side angle side to the telephoto side, a wrong trajector may be traced because the trajectories are divergent. In the passive automatic focusing device mentioned above, if the focusing lens position is contained in the depth of focus, the focusing lens may stop at a focusing position for an object distance of 3 m, even when an object at infinite position is being taken. If the zooming operation is conducted from the wide angle side to the telephoto side from a lens situation in which the lens is identified to be focused to an object distance different from the actual object distance, the lens continues to trace a wrong trajectory and eventually becomes positioned out of the depth of focus, thus generating a larger image blur, as the trajectories corresponding to different object distances diverge. Particularly, if the control of said automatic focusing device is interrupted and the zooming is conducted in the manual focusing state, defocus is almost certainly generated in the course of zooming, as the trajectory cannot be corrected during the zooming operation.

SUMMARY OF THE INVENTION

In consideration of the foregoing, a first object of the present invention is to provide a lens control device adapted for use in a lens system involving a change in the position of focal plane by the zooming operation, capable of avoiding defocus even in a manual focusing mode in which the automatic focusing is not conducted.

A second object of the present invention is to provide a lens control device which does not generate defocus even in a zooming operation from the wide angle side to the telephoto side which is apt to generate defocus.

The above-mentioned objects can be attained, according to a preferred embodiment of the present invention, by a lens control device comprising a first lens group for zooming; a second lens group for focusing; first zooming means for correcting the displacement in the focal plane, resulting from the movement of said first lens group, by controlling said second lens group thereby maintaining the focused state; memory means for storing relative position information of said second lens group with respect to said first lens group, in the course of the zooming operation by said first zooming means; calculation means for calculating the moving speed of said second lens group for maintaining the focused state in the course of movement of said first lens group, based on the data stored in said memory means; and second zooming means for controlling said second lens group based on the result of calculation by said calculation means.

Also according to another preferred embodiment of the present invention, there is disclosed a lens control device comprising a first lens group for zooming; a second lens group for focusing; first zooming means for correcting the displacement in the focal plane, resulting from the movement of said first lens group, by controlling said second lens group thereby maintaining the focused state; memory means for storing relative position information of said second lens group with respect to said first lens group, in the course of the zooming operation by said first zooming means; and second zooming means for controlling said second lens group based on the data stored in said memory means, during the movement of said first lens group.

Thus a zooming operation with little defocus can be achieved, even in the manual focusing mode, by memorizing the relative position of the focusing lens to the zooming lens for example in a zooming operation from the telephoto side to the wide angle side, which is relatively from defocus, and controlling the focusing lens according to thus memorized position data in the zooming operation from the wide angle side to the telephoto side, particularly in said manual focusing mode.

A third object of the present invention is to provide a lens control device which effects control in a situation prone to generate defocus, based on the stored information on the focusing lens position in a zooming operation without defocus, wherein said stored information can be stored on an arbitrary object and at an arbitrary time, by the operation of the operator.

A fourth object of the present invention is to provide a lens control device wherein the operator executes a zooming operation, causing the camera to memorize the relative position of the focusing lens to the zooming lens, in a zooming operation from the telephoto side to the wide angle side, which relatively free from defocus or in a zooming operation in which the moving speed of the focusing lens is controlled by the automatic focusing device, and the zooming operation from the wide angle side to the telephoto side, particularly in the manual focusing mode, is executed by tracking thus memorized position in order to attain a satisfactory zooming operation without defocus.

A fifth object of the present invention is to provide a lens control device which is capable of a satisfactory zooming operation utilizing the performance of an auto focusing device when it is in operation, also a satisfactory zooming operation without defocus based on the stored data in the manual focusing mode, and which can memorize the focusing lens position or the points of cam trajectory in a satisfactory zooming operation, by the selection of the operator, thereby effectively avoiding the defocus for a different object in case a manual zooming operation is conducted from the wide angle side to the telephoto side after a zooming operation from the wide angle side to the telephoto side.

The above-mentioned objects can be attained, according to a preferred embodiment of the present invention, by a lens control device comprising a first lens group for zooming; a second lens group for focusing; first zooming means for correcting the displacement of the focal plane resulting from the movement of said first lens group, by controlling said second lens group thereby effecting a zooming operation while maintaining the focused state; memory means for storing relative position information of said second lens group with respect to said first lens group; operation means for causing said memory means to store the relative position information of said second lens group with respect to said first lens group, in the course of the zooming operation by said first zooming means; and second zooming means for controlling said second lens group according to the data stored in said memory means, in the course of movement of said first lens group, when said operation means is operated.

Also there is disclosed a lens control device comprising a first lens group for zooming; a second lens group for focusing; auto focus detection means for detecting the focus state; first zooming means for correcting the displacement of the focal plane resulting from the movement of said first lens group, by controlling said second lens group by means of said auto focus detection means, thereby effecting a zooming operation while maintaining the focused state; memory means for storing relative position information of said second lens group with respect to said first lens group; and second zooming means for causing said second lens group to follow the movement of said first lens group according to the data stored in said memory means, in case said first lens group is moved while said auto focus detection means is inactive.

A sixth object of the present invention is to provide a lens control device capable of effecting a zooming operation without defocus, even for an object which is difficult to trace.

A seventh object of the present invention is to provide a lens control device which is capable, in switching to an operation to trace a specified cam trajectory, without correction by the auto focusing device, for an object prone to generate defocus in the course of a zooming operation, of automatically discriminating whether the lens is in the focused state, and executing said switching only in the focused state but giving an alarm to the operator in the unfocused state, whereby the priority is given to the focusing before the focus is fixed.

The above-mentioned objects can be attained, according to a preferred embodiment of the present invention, by a lens control device comprising a first lens group for zooming; a second lens group for focusing; focus detection means for detecting the focus state; first zooming means for correcting the displacement of the focal plane resulting from the movement of said first lens group, by controlling said second group with a characteristic curve thereof corresponding to the object distance and the output of said focus detection means, thereby effecting a zooming operation while maintaining the focused state; second zooming means for controlling said second lens group, at the movement of said first lens group, according to a characteristic curve allowing the zooming operation while maintaining the focused state only for a specified object distance; switch means for selectively switching said first and second zooming means; and control means for enabling the switching from said first zooming means to said second zooming means when said second lens group is in a position which can be considered substantially focused to said specified object distance.

Still other objects of the present invention, and the features thereof, will become fully apparent from the following description, which is to be taken in conjunction with the attached drawings.

DESCRIPTION OF THE PREFERRED EMBODIMENTS

Now the lens control device of the present invention will be clarified in detail by the preferred embodiments thereof, shown in the attached drawings.

Figure 1:
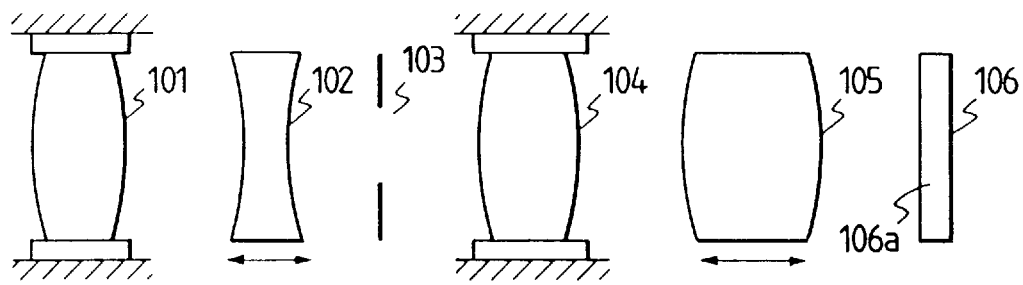
FIG. 1 is a schematic view of an ordinary inner focus lens system.
Figure 4:
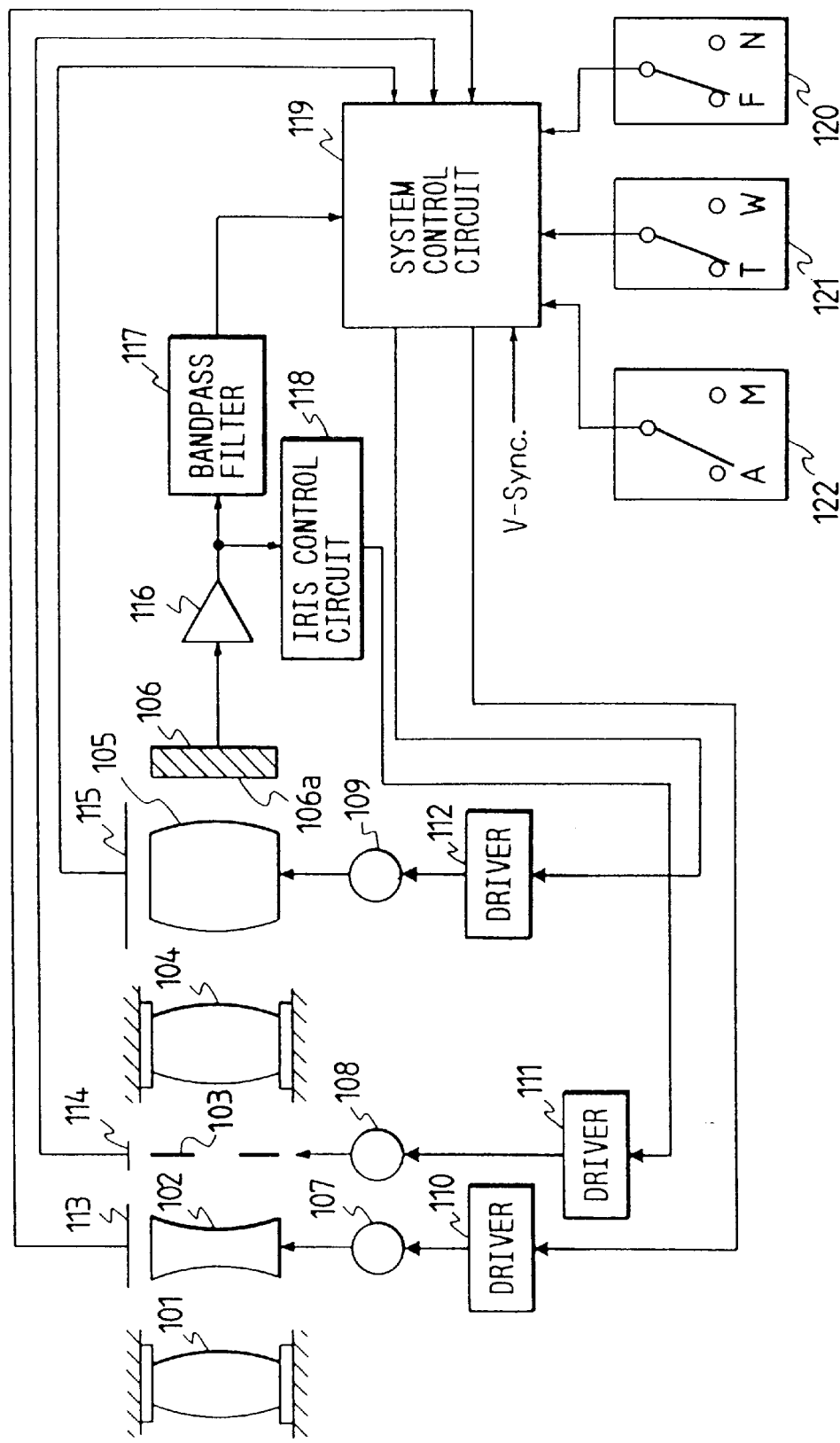
FIG. 4 is a block diagram showing the configuration of the lens control device of the present invention.

FIG. 4 is a block diagram of a first embodiment of the present invention, in which a lens control device is applied in a video camera, wherein components 101, 102, 103, 104, 105 and 106 are same as those shown in FIG. 1. There are also shown actuators 107, 108, 109 for respectively moving the zooming lens 102, the diaphragm 103 and the focusing lens 105; drivers 110, 111, 112 for respectively driving the actuators 107, 108, 109 in response to signals from a system control circuit 119 controlling the entire system; a zoom encoder 113, an iris encoder 114, a focus encoder 115 for detecting the states of the zooming lens 102, diaphragm 103 and focusing lens 105 and converting said states into electrical signals; an amplifier 116 for amplifying the output of the image sensor 106 to a predetermined level; a band-pass filter 117 for extracting a high frequency component, used for focus state detection, from the output signal of the image sensor 106; an iris control circuit 118 for controlling the state of diaphragm utilizing the output signal of the image sensor 116; and a system control circuit 119 composed of a microcomputer and adapted to control the entire system, including the control on the actuators 107, 109 based on the output signals of the zoom encoder 113, iris encoder 114, focus encoder 115 and band-pass filter 117.

There are further provided a focusing switch 120 for moving the focusing lens 105 in the manual focusing mode; a zooming switch 121; and an auto/manual selector switch 122 for switching the automatic and manual focusing.

Figure 3:
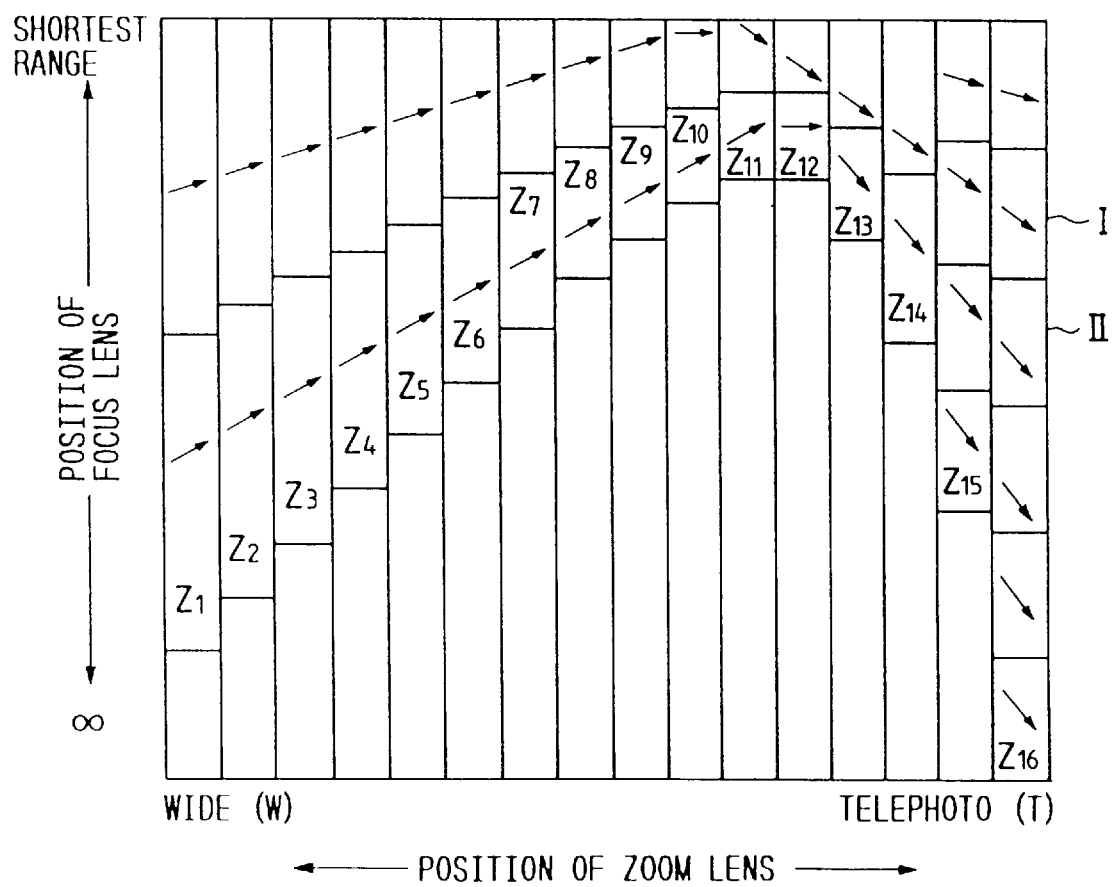
FIG. 3 is a chart in which the moving range of the zooming lens is divided into plural zones, and a representative moving speed of the focusing lens is assigned to each zone.
Figure 2:
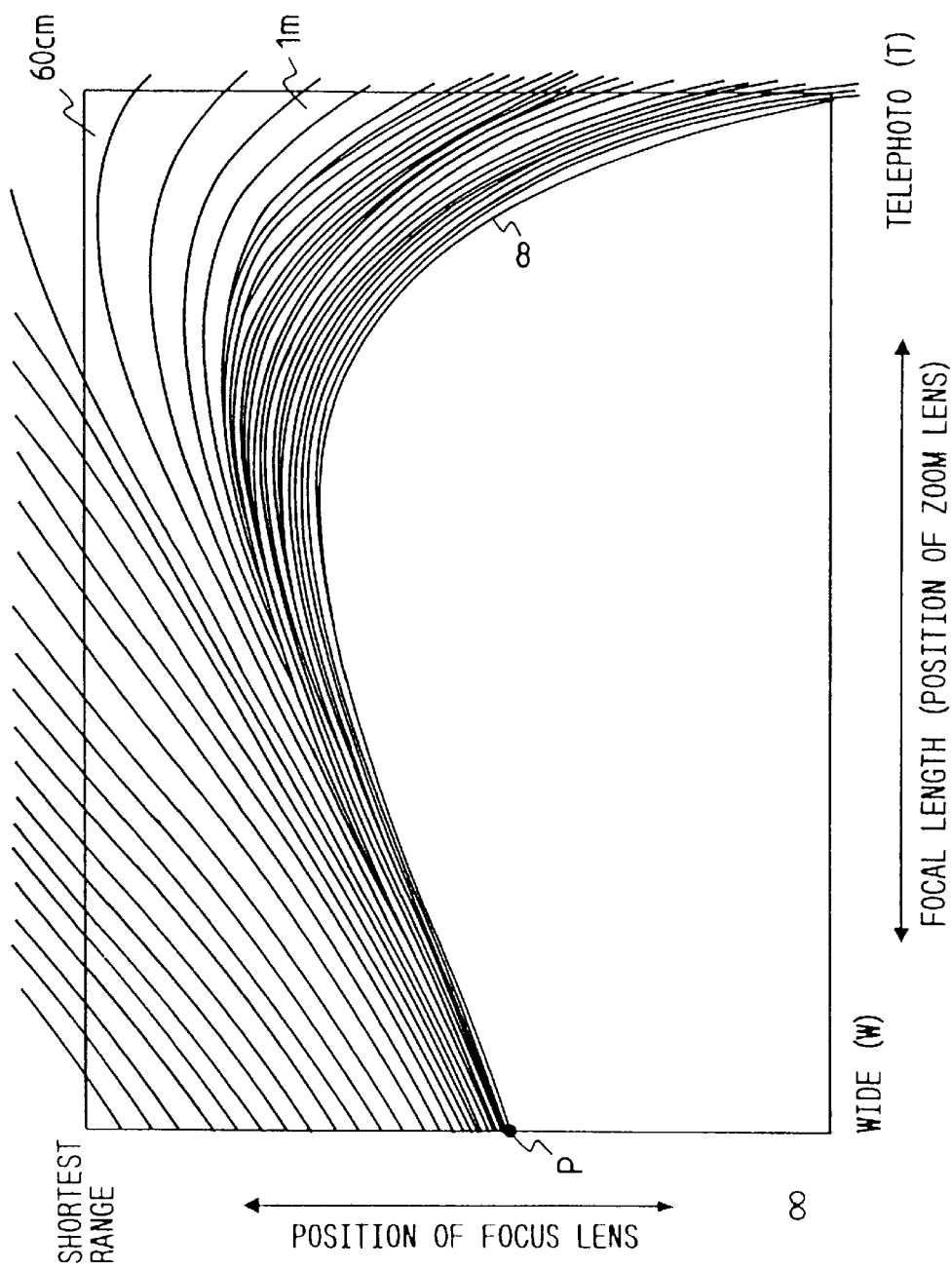
FIG. 2 is a characteristic chart showing the trajectories of a focusing lens for following the change in the focal length by a zooming lens, while maintaining the focused state.

In the camera system constructed as shown in FIG. 4, the system control circuit 119 controls the tracing of the trajectories of the zooming lens and the focusing lens as shown in FIG. 2. The speed information shown in FIG. 3 is stored in the form a table in the system control circuit 119, and the trajectory to be traced is determined from said table based on the positions of the focusing lens and the zooming lens, and the driving speed of the focusing lens following said trajectory is also determined from said table.

The system control circuit 119 also controls the focusing lens for automatic focusing, for example by detecting, from the output signal of the band-pass filter 117, the level of the high frequency components of the image signal and driving the focusing lens 105 through the driver 112 and the actuator 109 so as to maximize said level. Said auto focusing algorithm allows to identify whether the lens is in-focus or out-of-focus state, or whether the lens is focused in front of or behind the object, even in the course of a zooming operation.

Figure 5:
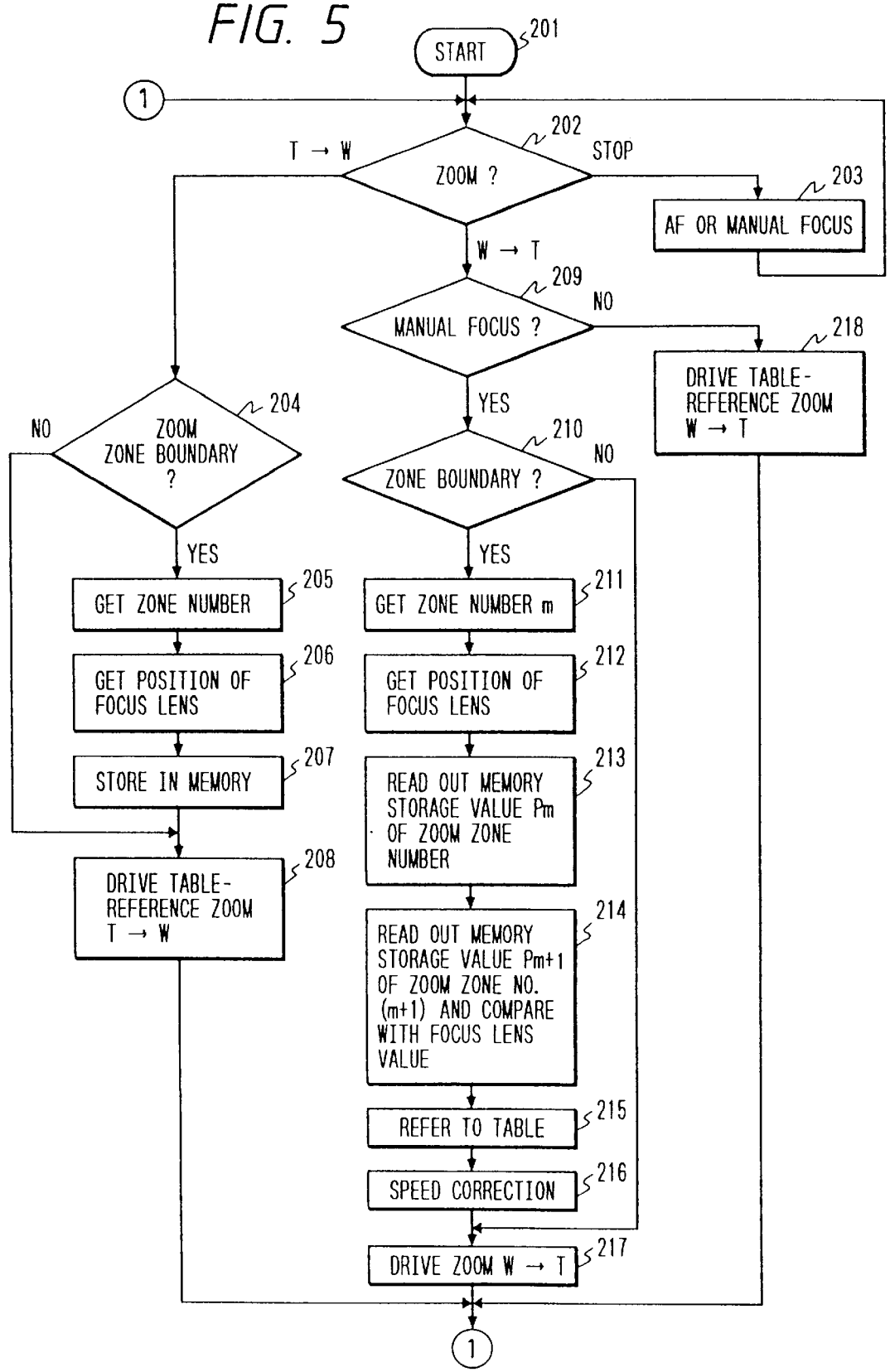
FIG. 5 is a flow chart, showing the function of a first embodiment of the lens control device of the present invention.

FIG. 5 is a flow chart showing the control sequence of the lens microcomputer 119.

When the process is started in a step 201, a step 202 discriminates whether the zoom switch 121 has been actuated, and, if not, a step 203 executes automatic or manual focusing according to the state of the switch 122.

After the in-focus state is reached by the focusing in the step 203, and if the step 202 identifies that the zoom switch 121 has been actuated for effecting the zooming operation, there is also discriminated whether said zooming operation is in the direction from the telephoto side to the wide angle side, or from the wide angle side to the telephoto side.

In case of a zooming operation from the telephoto side to the wide angle side, the sequence proceeds to a step 204 for discriminating whether the zooming lens is positioned at a boundary of the zoom zones shown in FIG. 3. If it is positioned on a boundary, a step 205 fetches the number assigned to said boundary, then a step 206 fetches the current position of the focusing lens, and a step 207 stores the information on the focusing lens position in a memory, in correspondence with the boundary number fetched in the step 205.

Figure 6:
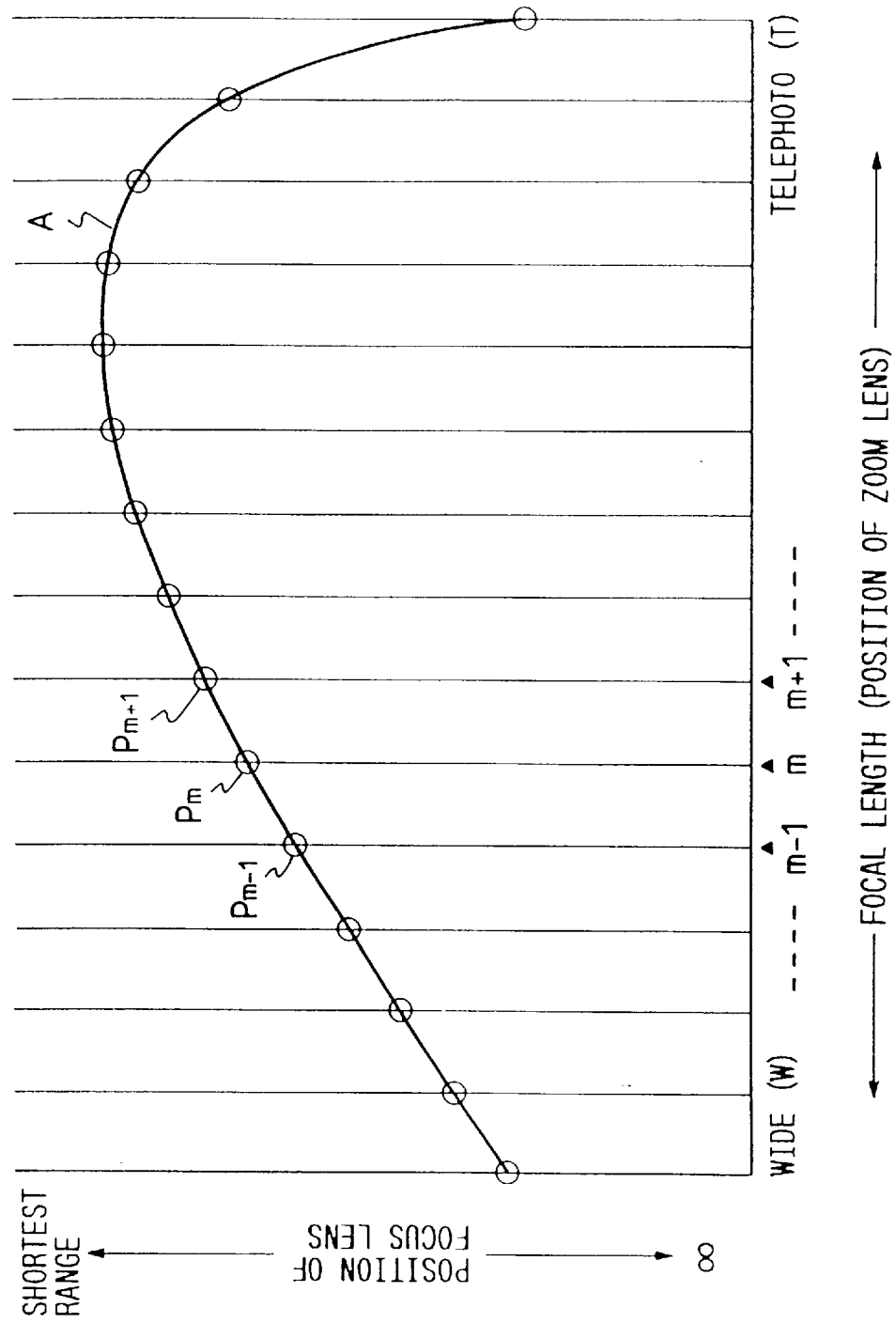
FIG. 6 is a chart sting the structure of a table storing the driving speed of the focusing lens as a function of the zooming lens position.

In such zooming operation from the telephoto side to the wide angle side, there are obtained stored data, as indicated by circles "○" in FIG. 6, wherein m, m+1, . . . are zoom zone numbers while $P_m$, $P_{m+1}$, . . . are focusing lens speeds memorized with m, m+1, . . . as the addresses.

Then a step 208 reads, from the table shown in FIG. 3, the driving speed for the focusing lens, in the course of zooming operation corresponding to the current zoom zone and the-current focusing lens position, and effects the zooming operation, with correction of trajectory, if necessary, by referring to the information on the front or rear focus state obtained from the automatic focusing program used in the step 203.

On the other hand, if the step 204 identifies that the zooming lens is not positioned on the boundary of the zoom zones, the steps 205, 206 and 207 are skipped, and the step 208 reads, from the table shown in FIG. 3, the driving speed for the focusing lens in the course of the zooming operation, corresponding to the current zoom zone and the current focusing lens position, and effects the zooming operation, with correction of trajectory by the focus state information obtained from the auto focusing control program.

In the inner focus lens system adopted in the present invention, as briefly explained in the foregoing, the cam trajectories corresponding to different object distances are easier to distinguish at the telephoto side but more difficult to distinguish at the wide angle side, because said trajectories mutually converge. This situation will be obvious in FIG. 2. Consequently, in a zooming operation from the telephoto side to the wide angle side in the focused state, it is possible to effect the zooming operation within the depth of focus, even without the automatic focusing, by selecting a cam trajectory corresponding to the object distance.

Consequently, the above-explained process ensures a satisfactory zooming operation with little defocus, from the telephoto side to the wide angle side, and allows to store, in the memory, the trajectory of the focusing lens in a satisfactory zooming operation.

In the following there will be explained the movement of the zooming lens from the wide angle side to the telephoto side.

When the step 202 identifies that the zooming lens is moved from the wide angle side to the telephoto side, a step 209 identifies the manual focusing mode or the automatic focusing mode. In case of auto focusing mode, the cam trajectory can be precisely corrected by the front/rear focus information from the automatic focusing device used in the step 203. Thus a step 218 selects a cam trajectory from the aforementioned table, storing the driving speed for the focusing lens, corresponding to the positions of the zooming lens and the focusing lens, and executes the zooming operation along said trajectory, from the wide angle side to the telephoto side.

If the step 209 identifies the manual focusing mode, a step 210 discriminates whether the zooming lens is positioned at the boundary of the zoom zones, and, if not, a step 217 causes the focusing lens to follow the zooming operation of the zooming lens from the wide angle side to the telephoto side, utilizing the corrected speed information for the focusing lens, determined in a step 216 (to be explained later) in the immediately preceding control sequence.

If the step 210 identifies that the zooming lens is positioned on the boundary of the zoom zones, a step 211 fetches the number m of said zoom zone, then a step 212 fetches the current position information of the focusing lens, based on the output of the focus lens position encoder 115, and a step 213 reads the stored data Pm of the driving speed for the focusing lens (corresponding to the circle in FIG. 6), stored in the step 207, from a memory address corresponding to the zoom zone number m fetched in the step 211. Said read data indicates the cam trajectory for effecting a zooming operation with little defocus if the object distance is same as that when the data are stored by the zooming operation from the telephoto side to the wide angle side.

Then a step 214 compares the current focusing lens position fetched in the step 212 with the stored data Pm read from the memory in the step 213, and detects the amount and direction of aberration of the current focusing lens position with respect to the stored data.

A next step 215 selects a cam trajectory for the focusing lens drive speed in the course of zooming operation, by referring to the table shown in FIG. 3 in the same manner as in the step 218 and utilizing the zooming lens position obtained in the step 211 and the focusing lens position obtained in the step 212, and extracts the data of said trajectory only. Then a step 216 discriminates, from the amount and direction of aberration in the movement of the focusing lens, determined in the step 214, whether the lens is focused at the front side or rear side of the object, and corrects the driving speed information for the focusing lens, selected from the table in the step 215. For example, if the speed data obtained in the step 215 are to drive the focusing lens toward the shortest object distance side and if the result of discrimination in the step 214 indicates that the focus is aberrated to the front side, the focusing lens position is corrected toward the rear side focusing by decreasing the driving speed obtained from the table in the step 215. Then a step 217 executes the zooming operation from the wide angle side to the telephoto side and causes the focusing lens to follow said zooming operation, with the speed corrected in the step 216. On the other hand, if the result in the step 214 indicates that the focus is aberrated to the rear side, the focusing lens position is corrected toward the front side by increasing the speed derived from the table in the step 215.

Also in case the speed data derived in the step 215 are to drive the focusing lens toward the infinite distance side, correction can be attained in a similar manner, by inverting the direction of correction of the focusing lens position.

As explained in the foregoing, in the zooming operation from the telephoto side to the wide angle side, the focusing lens is controlled faithfully to the cam trajectory even in the manual focusing mode, and, in the zooming operation from the wide angle side to the telephoto side, the zooming is conducted faithfully to the cam trajectory in the zooming from the telephoto side to the wide angle side, only in case of the manual focusing mode. As a result, a zooming operation without defocus can be attained as long as the object distance remain constant, not only in case of automatic focusing but also in manual focusing.

In the so-called inner focus lens system explained above, since the focusing lens is positioned closer than the zooming lens to the image sensor, the sensitivity of the focusing lens position varies scarcely, as a function of the focal length. Consequently, in a zooming operation, if the lens is focused within the depth of focus at the starting point, it is possible to follow a fixed cam trajectory, maintaining the amount of defocus at the start, namely without increasing the defocus. This fact is already confirmed experimentally by the present inventors.

In the foregoing description of the drawbacks of the prior art, it was mentioned that a zooming operation from the wide angle side to the telephoto side would generate a defocus if it was started from a position focused to another object distance within the depth of focus. However this is a phenomenon caused by erroneous selection of a cam trajectory among plural ones stored in the table as shown in FIG. 2, and is not contradictory to the present embodiment.

As explained in the foregoing, the lens control device of the present invention is provided with means for memorizing the cam trajectory in the course of a zooming operation from the telephoto side to the wide angle side, and is capable, in the zooming operation from the wide angle side to the telephoto side in the manual focusing mode, of correcting the driving speed of the focusing lens in the course of said zooming operation, based on said memorized data, thereby enabling a zooming operation without defocus in either direction.

In the following there will be explained a second embodiment of the present invention.

The above-explained first embodiment is featured by memorizing, in the zooming operation of the zooming lens from the telephoto side to the wide angle side, the position of the focusing lens relative to the zooming lens on each boundary of plural zoom zones, and controlling the position of the focusing lens based on thus memorized information in the zooming operation from the wide angle side to the telephoto side.

In contrast, the second embodiment to be explained in the following is featured by calculating and controlling the driving speed of the focusing lens, based on the relative position of the focusing lens memorized in a similar manner as in the first embodiment.

Figure 7:
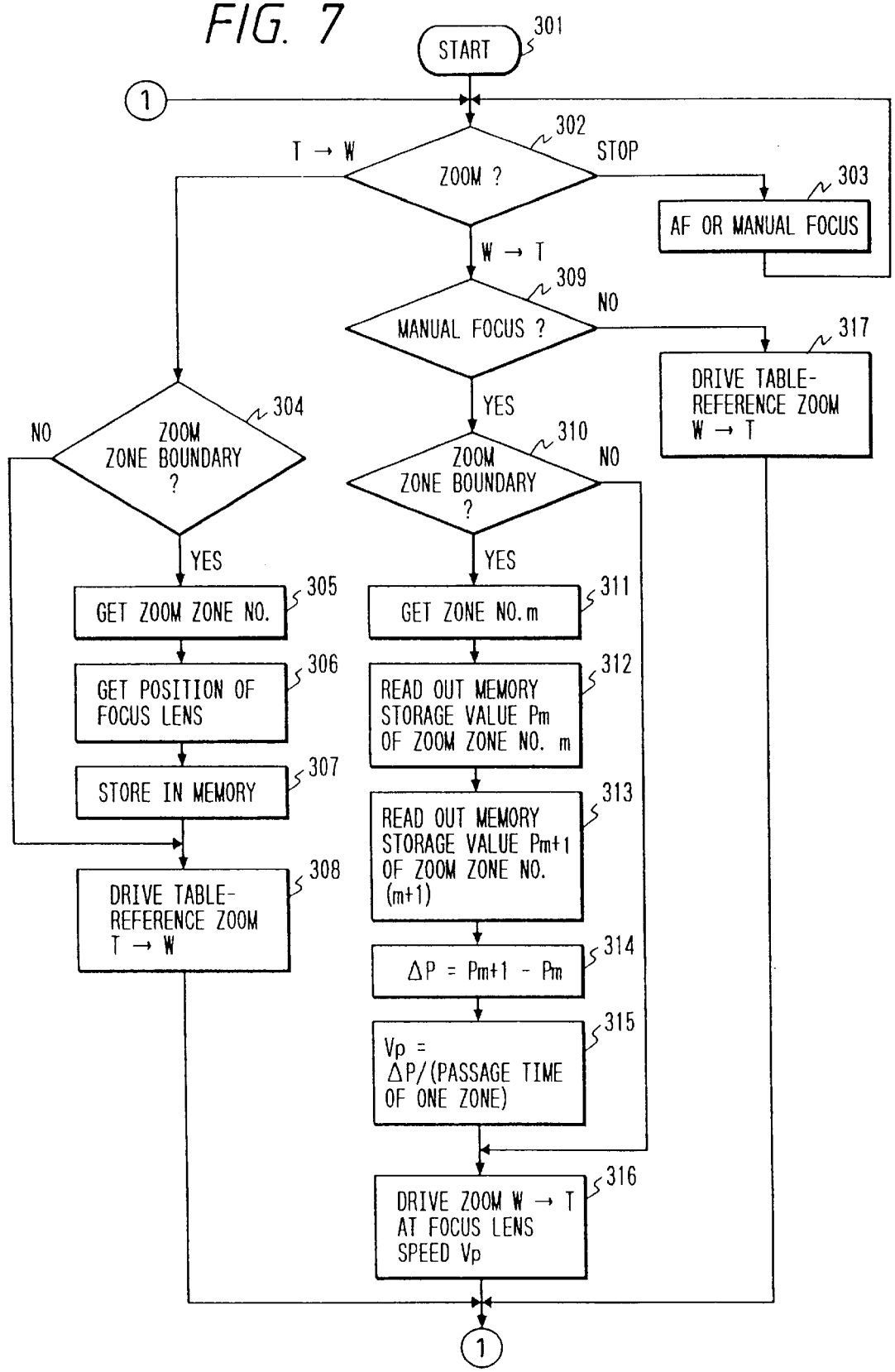
FIG. 7 is a flow chart showing the function of a second embodiment of the lens control device of the present invention.

FIG. 7 is a flow chart showing the control sequence of the lens microcomputer 119 in the second embodiment of the present invention.

In FIG. 7, the process of steps 301 to 309 is same as that of the steps 201 to 209 in the flow chart of the first embodiment shown in FIG. 5, and will not, therefore, be explained in detail. In the same manner as in FIG. 5, after the process is started in the step 301, a zooming operation is conducted from the telephoto side to the wide angle side, and the focus lens positions $P_m$, $P_{m+1}$, . . . are fetched and memorized in the memory at the boundaries m, m+1, . . . of the zoom zones as shown in FIG. 6.

The present embodiment is featured by the control sequence when the zooming lens is moved from the wide angle side to the telephoto side.

Referring to FIG. 7, when a step 302 identifies that the zooming lens is being moved from the wide angle side to the telephoto side, a step 309 discriminates whether the manual focusing mode or the auto focusing mode is selected. In case of the auto focusing mode, since the cam trajectory can be precisely corrected by the front/rear focus information from the automatic focusing device used in the step 303, a step 317 effects a zooming operation from the wide angle side to the telephoto side, referring to the aforementioned table storing the driving speed for the focusing lens, corresponding to the positions of the zooming lens and the focusing lens.

If the step 309 identifies the manual focusing mode, a step 310 discriminates whether the zooming lens is positioned at the boundary of the zoom zones, and, if not, a step 316 causes the focusing lens to follow the zooming operation of the zooming lens from the wide angle side to the telephoto side, utilizing the speed information for the focusing lens, determined by a step 315 (to be explained later) in the immediately preceding control sequence.

If the step 310 identifies that the zooming lens is positioned on the boundary of the zoom zones, a step 311 fetches the number m of said zoom zone, and steps 312 and 313 read, from memory addresses corresponding to the zoom zone numbers m and m+1, the stored data $P_m$, $P_{m+1}$ of the driving speed for the focusing lens, stored in the step 307. Then a step 214 calculates the difference $\Delta P$ of $P_m$ and $P_{m+1}$, and a step 315 calculates the moving speed $V_p$ of the focusing lens in passing the zoom zone, by dividing $\Delta P$ with the time required for passing said zoom zone.

Then a step 316 drives the focusing lens with the driving speed $V_p$ determined in the step 315, in pursuit of the zooming operation.

The time required for passing the zoom zone can be determined by dividing the moving time of the zooming lens from the wide angle end to the telephoto end with the number of zoom zones. Also said passing time of the zoom zone can be measured, by counting the number of vertical synchronization periods by the system control circuit 119 in a period of movement of the zooming lens from a boundary of the zoom zone to a next boundary, utilizing the output signal of the zoom encoder 113, since one vertical synchronization period is 1/60 sec. in the NTSC standard.

Also if a stepping motor is employed as the actuator for the focusing lens, and if the position of said focusing lens can be represented by the number of driving pulses for said motor, the driving speed $V_p$ is equal to the number of driving pulses per unit time of said stepping motor.

In this manner there can be determined the driving speed $V_p$ of the focusing lens, in the zooming operation from the wide angle side to the telephoto side, without the automatic focusing. Consequently, by moving the focusing lens to the in-focus position at the wide angle side, prior to the zooming operation, and by driving the focusing lens with the above-mentioned speed in the step 216, there can be attained the zooming operation without defocus, even without the automatic focusing, as long as the object distance remains constant.

The foregoing first and second embodiments are featured by memorizing the position of the focusing lens in the movement of the zooming lens from the telephoto side to the wide angle side and controlling the focusing lens according to thus memorized information in the zooming operation from the wide angle side to the telephoto side, but, even in these methods, defocus is generated if the object distance is carelessly varied in the manual zooming operation from the wide angle side to the telephoto side. Also the operation is unable to distinguish the zooming operation by the memorized data from the ordinary zooming operation. A third embodiment to be explained in the following enables the operation of memorizing the focusing lens position or the trajectory only at a predetermined operation by the operator. Thus, since the operator can select a desired object and intentionally memorize the trajectory therefor, the operator can confirm the zooming state in advance, prior to the phototaking operation.

The present embodiment is identical, in the circuit configuration, with the embodiment shown in FIG. 4, but is different in the control algorithm of the microcomputer 119.

Figure 8:
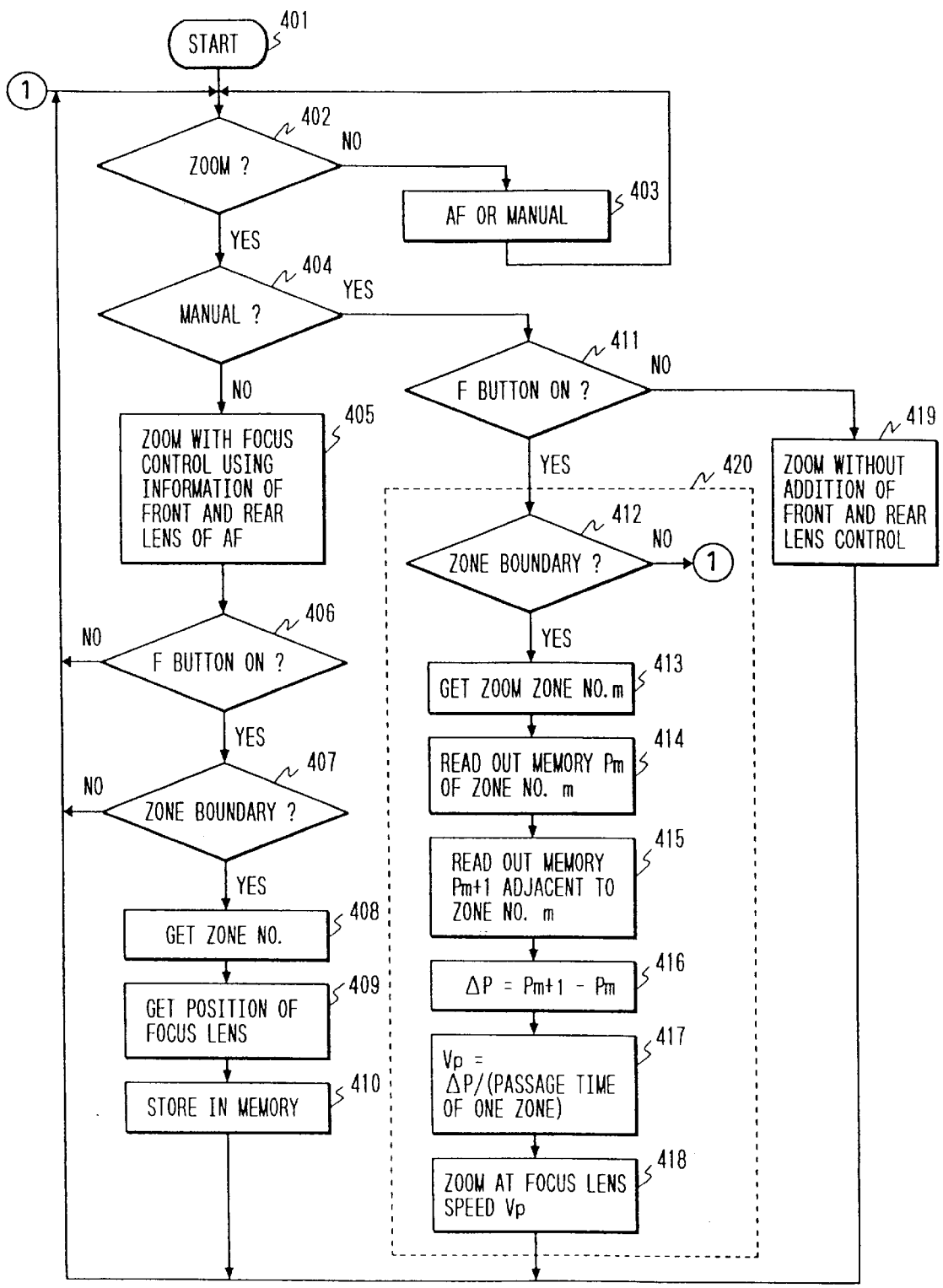
FIG. 8 is a flow chart showing the function of a third embodiment of the present invention.

FIG. 8 is a flow chart showing the control sequence of the lens microcomputer 119.

When the process is started in a step 401, a step 402 discriminates whether the zoom switch 121 has been actuated, and, if not, a step 403 executes automatic or manual focusing according to the state of the switch 122.

After the in-focus state is reached by the focusing in the step 403, and if the step 402 identifies that the zoom switch 121 has been actuated for effecting the zooming operation in either direction, there is executed the following process.

A step 404 discriminates whether the focusing mode is automatic or manual, and, in case of automatic focusing mode, a step 405 effects control for regulating the driving speed for the focusing lens in the course of the zooming operation, according to the front/rear focus information of the automatic focusing device. Then a step 406 discriminates whether an infinity button (F button) of a manual focusing switch 120 has been depressed in the course of the zooming operation. If the F button has not been depressed, the zooming operation is conducted in the conventional manner, so that the sequence returns to the step 402.

Said infinity direction button (F button) of the manual focus switch 120 is used, not for the manual focusing, but for effecting an operation of memorizing the focus lens position in the course of the zooming operation, as will be explained later. In the device of the present embodiment, during the zooming operation, the manual focus switch is rendered inactive for driving the focusing lens. Consequently, during the zooming operation, said F button is used for memorizing the focusing lens position in the automatic focusing mode, and for driving the focusing lens according to the memorized data in the manual focusing mode. Other switches may therefore be used for this purpose, as long as other functions are not affected.

If the step 406 identifies that the F button has been depressed, a step 407 discriminates whether the zooming lens is positioned on the boundary of the zoom zones shown in FIG. 6 or 3, and, if not, the sequence returns to the step 402. If the zooming lens is positioned on said boundary, a step 408 fetches the number assigned to said boundary. Said boundary number can be easily fetched if it is correlated in advance with the output of the zooming lens position encoder 113. Then a step 409 fetches the current focusing lens position, and a step 410 stores the information of the focusing lens position, fetched in the step 409, in a memory address corresponding to the boundary number fetched in the step 408. Said stored data correspond to circles in FIG. 6, and consist of the focusing lens positions $P_m$, $P_{m+1}$, ... fetched in the step 409, respectively corresponding to the zoom zone boundaries m, m+1, ... fetched in the step 408. After the storage into the memory, the sequence returns to the step 402.

In case the step 402 identifies the zooming operation and the step 404 identifies the manual focusing mode, in which the zooming operation is executed without the front/rear focus information from the automatic focusing device, a step 411 discriminates whether said F button has been depressed, and, if not, a step 419 executes a zooming operation without correction by said front/rear focus information. In this case, if the zooming operation erroneously starts to follow a cam trajectory of a wrong object distance, correction is not executed.

In case the step 411 identifies the depression of the F button, a step 412 discriminates whether the zooming lens is positioned on the boundary of zoom zones, based on the output of the zoom encoder 113, and it is on said boundary, a step 413 fetches the zoom zone number m from the output of the zoom encoder, as in the step 408. Then a step 414 reads, from a memory address corresponding to the fetched zoom zone number m, the focusing lens position $P_m$ memorized in the step 410, and a step 415 read the memorized value $P_{m+1}$ in the memory corresponding to the zoom zone number m+1 adjacent to number m.

These data m, m+1, $P_m$, $P_{m+1}$ are correlated as shown in FIG. 6. More specifically, these data read from the memory indicate the focusing lens positions at the mutually neighboring boundaries of the zoom zone, and the positions shown in FIG. 6 are of a zooming operation from the wide angle side to the telephoto side. In a zooming operation from the telephoto side to the wide angle side, $P_{m+1}$ is positioned at the left side of $P_m$.

After two memorized values for the focusing lens are read in this manner, a step 416 calculates the difference $\Delta P$ of $P_{m+1}$ and $P_m$, and a step 417 calculates the driving speed Vp of the focusing lens from $\Delta P$. The moving speed Vp of the focusing lens in passing a zone from m to m+1 can be calculated by dividing the amount $\Delta P$ of movement of the focusing lens with the passing time of a zone. Said passing time of the zoom zone can be measured, by counting the number of vertical synchronization periods by the system control circuit 119 in a period of movement of the zooming lens from a boundary of the zoom zone to a next boundary, utilizing the output signal of the zoom encoder 113, since one vertical synchronization period is 1/60 sec. in the NTSC standard.

A moving amount $\Delta P$ for the focusing lens can be attained in said zoom zone by driving the focusing lens with the moving speed Vp in the course of the zooming operation, so that the movement becomes substantially equal to that in which the data are memorized in the steps 407 to 410.

Through these operations it is rendered possible to effect a zooming operation without defocus, by controlling the focusing lens faithfully to the cam trajectory in the course of the zooming operation, even in the manual focusing mode.

This method is extremely effective in taking an object of low contrast or high luminance, which is difficult to handle with a passive auto focusing system. In photographing such difficult object, a zooming operation is conducted in advance, with the depression of the F button, to an easily focused object at a substantially same distance as that of said difficult object, in order to memorize the passing points of the focusing lens, and then a zooming operation is conducted again, with the depression of the F button, to said difficult object. In this method, since the focusing lens can be controlled according to the memorized data, the zooming operation without defocus can be attained, without eventual influence of the erroneous operations of the auto focusing device.

In the so-called inner focus lens system explained above, since the focusing lens is positioned closer than the zooming lens to the image sensor, the sensitivity of the focusing lens position varies scarcely, as a function of the focal length. Consequently, in a zooming operation, if the lens is focused within the depth of focus at the starting point, it is possible to follow a fixed cam trajectory, maintaining the amount of defocus at the start, namely without increasing the amount of defocus. This fact is already confirmed experimentally by the present inventors.

In the foregoing description of the drawbacks of the prior art, it was mentioned that a zooming operation from the wide angle side to the telephoto side would generate a defocus if it was started from a position focused to another object distance within the depth of focus. However this is a phenomenon caused by erroneous selection of a cam trajectory among plural ones stored in the table as shown in FIG. 3, and is not contradictory to the present embodiment.

Figure 9:
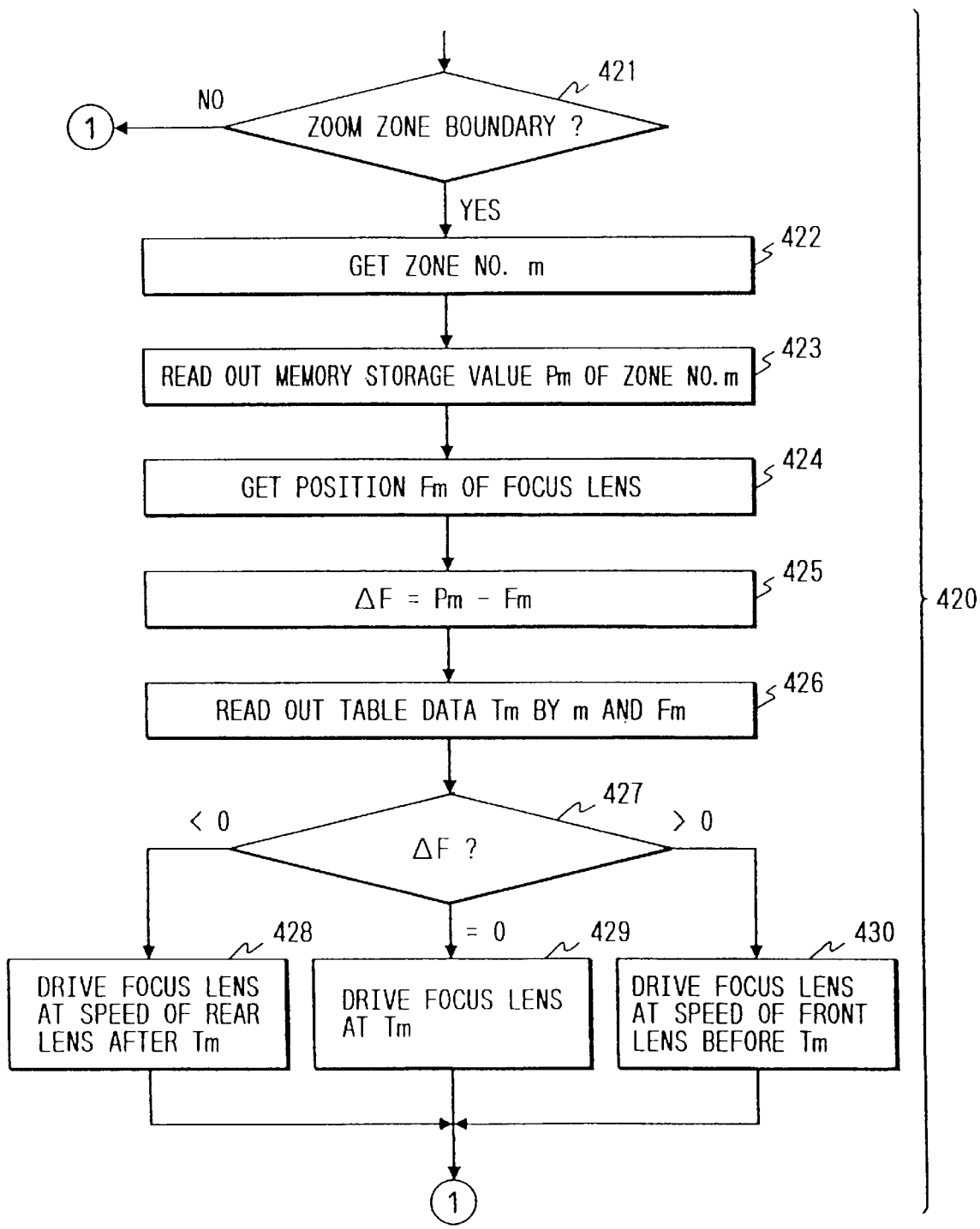
FIG. 9 is a flow chart showing the function of a fourth embodiment of the present invention.

FIG. 9 is a flow chart of a fourth embodiment of the present invention. This embodiment provides another method of movement of the focusing lens, and is realized by replacing a process 420 in the third embodiment shown in FIG. 8, by the flow chart shown in FIG. 9.

In the sequence shown in FIG. 8, in case the step 402 identifies that a zooming operation is in progress, then the step 404 identifies that the manual focusing mode is selected and the step 411 identifies that the F button has been depressed, the sequence proceeds to the flow shown in FIG. 9. At first a step 421 discriminates whether the zooming lens is on the boundary of zoom zones, and, if not, the sequence returns to the step 402 in FIG. 8. If the zooming lens is on said boundary, steps 422 and 423 fetch the zone number m and read, from a memory address corresponding to said zone number m, the memorized data $P_m$ on the focusing lens position. Then a step 424 fetches the current focusing lens position $F_m$ from the focus encoder, and a step 425 calculates the difference $\Delta F$ between $P_m$ and $F_m$, and a step 426 fetches the table data $T_m$ of the focusing lens speed shown in FIG. 3, based on the zooming lens position m and the focusing lens position $F_m$. Said table data, shown in FIG. 3, provide the standard speed required for tracking the cam trajectory. However, if said standard speed is given to the focusing lens without correction, the zooming operation will not be corrected by the front/rear focus information, so that correction cannot be made even if the zooming operation erroneously starts to follow the cam trajectory of another object distance.

In order to prevent such situation, a step 427 discriminates the sign of ΔF, and if ΔF is positive, $P_m$ is larger so that the focusing lens is positioned at the rear-focused side with respect to the memorized position, assuming that the coordinate of the focusing lens increases toward the shortest object distance as shown in FIG. 2. In such case a step 430 modifies the driving speed for the focusing lens, from the standard driving speed $T_m$ fetched from the table shown in FIG. 3, toward the front-focused situation thereby correcting the rear-focused state.

Also, if ΔF is negative, the lens is front-focused so that the driving speed for the focusing lens is corrected toward the rear-focused state. If ΔF is 0, the lens is in the focused state, so that the zooming operation is conducted by driving the focusing lens with the standard speed $T_m$.

The above-explained control method enables a zooming operation without defocus, by applying correction to the table data read so as to trace the memorized trajectory of the focusing lens.

As explained in the foregoing, the lens control device of the present invention is provided with means for memorizing, in response to a predetermined operation, the cam trajectory in the course of a defocus-free zooming operation executed under satisfactory conditions of the object, and enables, for example in a zooming operation from the wide angle side to the telephoto side in manual focusing mode, to control the driving speed of the focusing lens in the course of said zooming operation according to the memorized data, thereby allowing the focusing lens to trace said memorized cam trajectory. Thus, for any object of the same object distance, a defocus-free zooming operation can be achieved in any direction, regardless of the luminance conditions of said object.

In the following there will be explained a fifth embodiment of the present invention.

As in the foregoing embodiments, this embodiment memorizes the positions of the focusing lens in relation to the positions of the zooming lens in a zooming operation from the telephoto side to the wide angle side and controls the focusing lens by thus memorized data in a zooming operation from the wide angle side to the telephoto side in manual focusing mode, but the present embodiment is featured by selecting a predetermined time for the movement of the focusing lens during the passing time of the zooming lens through each of the plural zoom zones, then calculating the focusing lens speed from said predetermined time and the memorized focusing lens position, and controlling the driving speed of the focusing lens in each zoom zone.

In the following there will be explained the control algorithm of the present embodiment.

Figure 10:
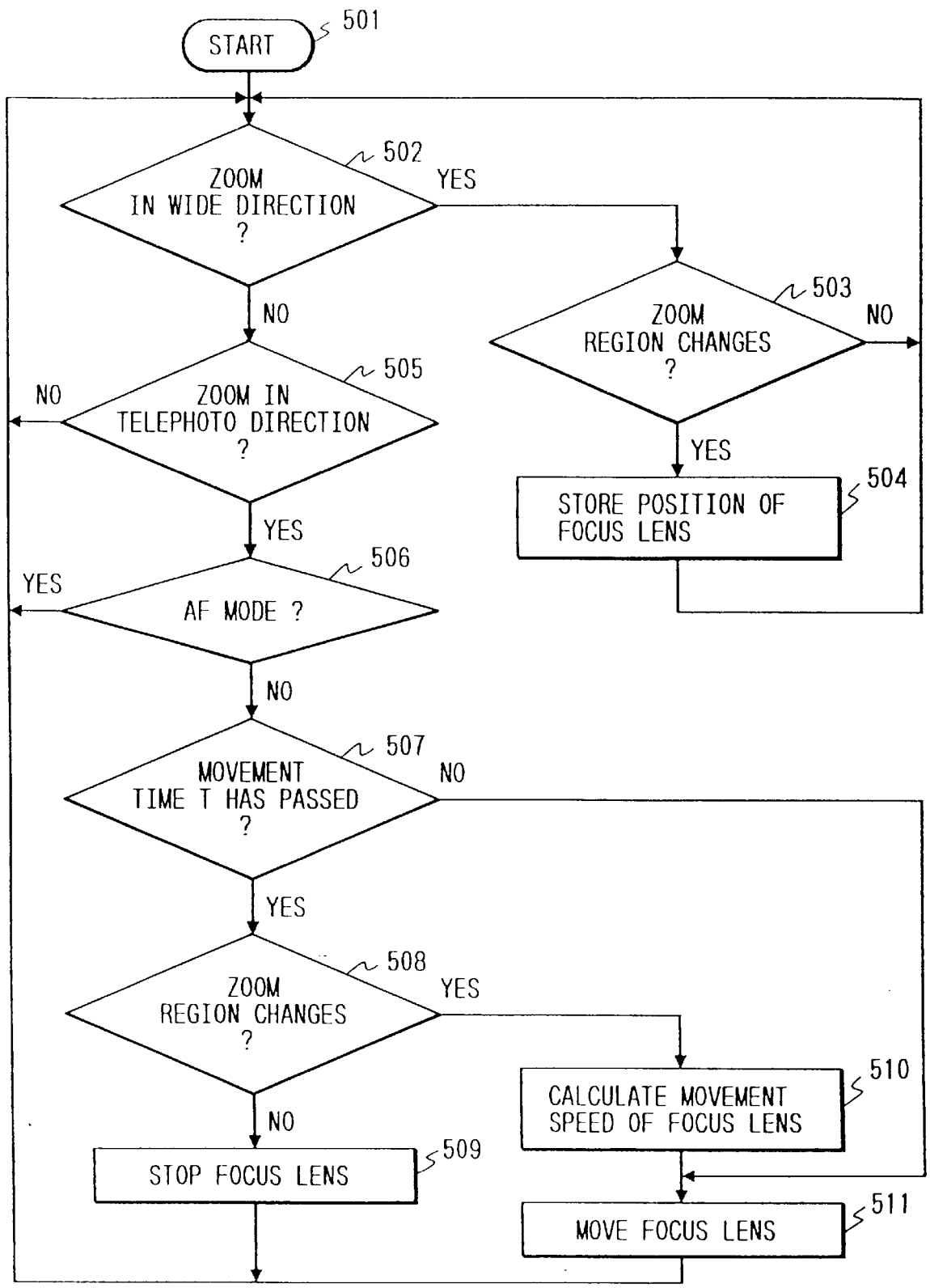
FIG. 10 is a flow chart showing the function of a fifth embodiment of the present invention.

FIG. 10 is a flow chart showing the control sequence of the microcomputer 119.

When the sequence is started in a step 501, a step 502 discriminates whether a zooming operation is being conducted toward the wide angle side, and, if conducted, the sequence proceeds to a step 503.

The step 503 identities, from the output of the encoder 113 (FIG. 4) for detecting the position of the zooming lens 102, the zone in which the zooming lens is currently positioned, and, if the current zone is different from the zone in which the zooming lens was previously positioned, namely if the zooming lens 102 has moved to a next zone by zooming, the sequence proceeds to a step 504.

The step 504 detects, from the output of the position encoder 115, the position of the focusing lens 105 when the zooming lens 102 has moved to the different zone, and memorizes thus detected position of the focusing lens 105, in correspondence with the shifted position of the zooming lens 102, in the microcomputer 119.

The process of the steps 501 to 504 is repeated while the zooming operation is conducted toward the wide angle side. For example, if the focusing lens 105 and the zooming lens 102 move in a relationship represented by a curve A in FIG. 6, in the zooming operation toward the wide angle side, the positions of the focusing lens 105 are memorized, in relation to the varied positions of the zooming lens 102 in different zones, in the microcomputer 119 (trajectory memory means).

If the step 502 in FIG. 10 identifies that the zooming operation toward the wide angle side is not being conducted, the sequence proceeds to a step 505 for discriminating a zooming operation toward the telephoto side. If the step 505 identifies a zooming operation toward the telephoto side, the sequence proceeds to a step 506, but, if such zooming operation is not identified, the sequence returns to the step 502.

The step 506 discriminates whether the auto focusing mode or the manual focusing mode is selected, and, if the manual mode is selected, a step 507 sets a predetermined time T for the movement of the focusing lens 105 during the passage of the zooming lens 102 through a zone, and discriminates whether said predetermined moving time T has elapsed. If the step 507 identifies that said moving time T has elapsed, the sequence proceeds to a step 508, but, if said moving time T has not elapsed, the sequence proceeds to a step 511.

The step 508 discriminates, in a similar manner as in the step 503, whether the zone to which the zooming lens 102 belongs has changed, and the sequence proceeds to a step 510 or 509 respectively if such zone change has occurred or not.

The step 510 calculates the moving speed of the focusing lens 105, based on the position of said focusing lens 105 memorized in the microcomputer 119 in the step 504 and on the predetermined moving time T of the focusing lens 105 (moving speed determining means).

Figure 11:
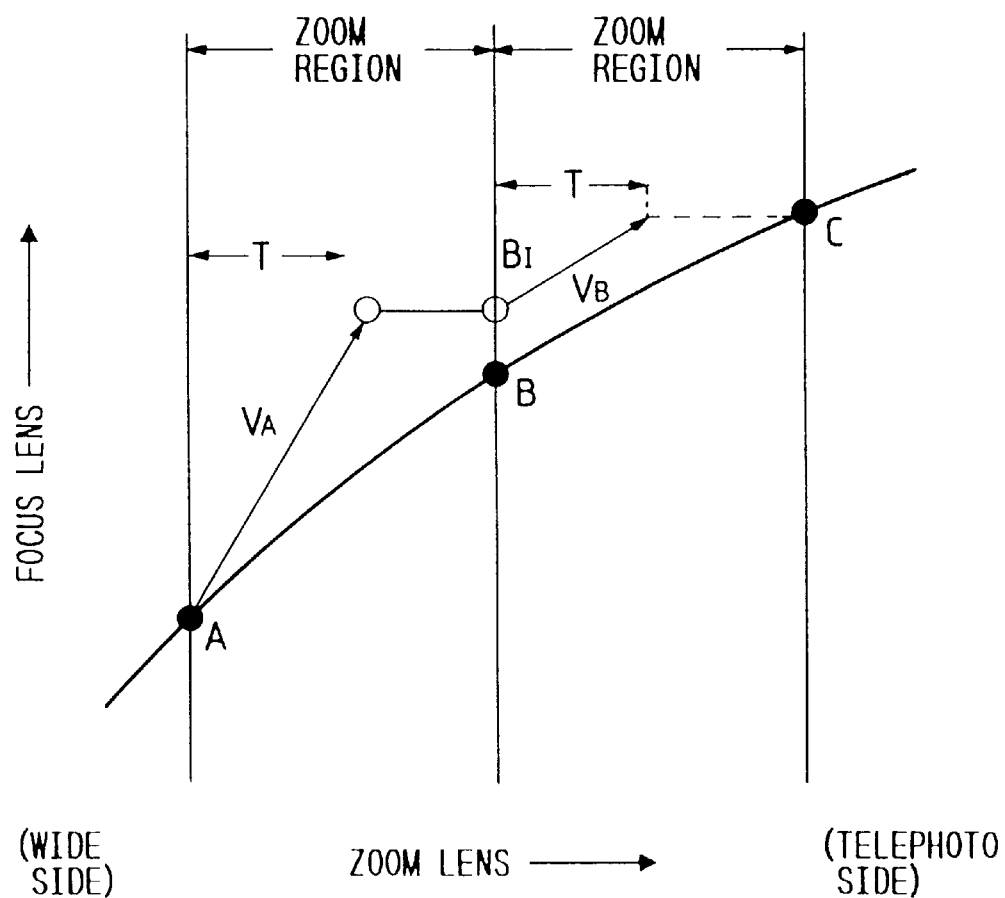
FIG. 11 is a chart showing the function of the fifth embodiment of the present invention.

FIG. 11 shows the method of calculation of the moving speed of the focusing lens 105. In FIG. 11, black circles indicate the positions of the focusing lens 105, memorized in the step 504 in the microcomputer 119, corresponding to transitions of the zooming lens 102 between the zones. In the course of movement of the zooming lens toward the telephoto side in a zooming operation, if the focusing lens 105 is positioned at A in FIG. 11, corresponding to a transition of the zooming lens 102 between the zones, the moving speed $V_A$ of the focusing lens 105 at this point can be given by:

$$V_A = (B-A)/T \quad (1)$$

wherein B is the memorized position of the focusing lens at the next transition of the zooming lens 102 between the zones, and T is the predetermined moving time of the focusing lens.

The focusing lens 105 is then moved with thus calculated moving speed $V_A$, for the predetermined moving time T.

As a result the focusing lens 105 reaches a position B1 after said moving time T, and it is stopped until the next transition between the zones. Then, at the next transition between the zones, the moving speed $V_B$ of the focusing lens 105 is calculated from the position B1, the memorized position C of the focusing lens 105 at the next transition between the zones, and the predetermined moving time T, and the focusing lens 105 is moved with said moving speed $V_B$, for the predetermined moving time T.

The step 510 calculates the moving speed of the focusing lens 105 as explained above, then a step 511 starts the movement of the focusing lens 105, and the sequence then returns to the step 502.

If the step 507 identifies that the moving time for the focusing lens 105 has not elapsed, a step 511 continues the movement of the focusing lens 105, and the sequence then returns to the step 501.

Also if the step 508 identifies that the change in the zone has not taken place, the focusing lens 105 is stopped and the sequence returns to the step 502.

In the course of the zooming operation toward the telephoto side with the manual focusing mode, the above-explained process is repeated thereby determining the moving speed of the focusing lens 105 from the memorized position thereof and the predetermined moving time, and moving the focusing lens 105 with thus determined moving speed, whereby the focusing lens 105 is controlled to precisely track the memorized positions.

As explained in the foregoing, the lens control device of the present invention memorizes the trajectory tracked by the focusing means in the course of a zooming operation from the telephoto side to the wide angle side, and inversely tracks the memorized positions of the focusing lens in a zooming operation from the wide angle side to the telephoto side with the manual focusing mode, thereby enabling, for example in a video camera system of inner focus type, a zooming operation toward the telephoto side, while maintaining the in-focus state in the manual focusing mode.

In the following there will be explained a sixth embodiment of the present invention.

In contrast to the foregoing fifth embodiment in which the driving time T for the focusing lens is predetermined in each zoom zone and the driving speed for the focusing lens is calculated from said driving time T and the memorized information on the focusing lens position, the present embodiment is featured by predetermining the driving speed for the focusing lens and varying the driving time therefor.

Figure 12:
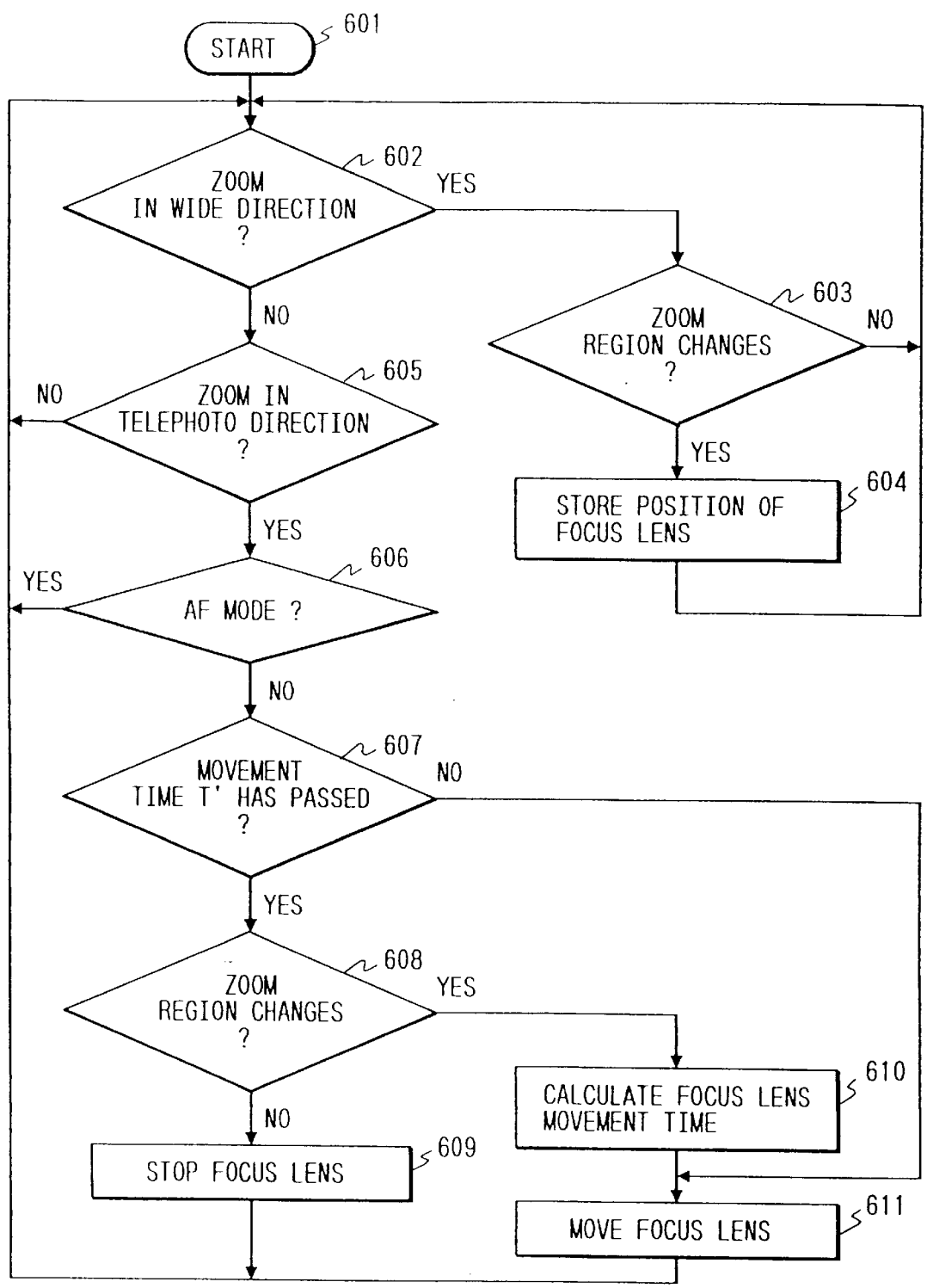
FIG. 12 is a flow chart showing the function of a sixth embodiment of the present invention.

Referring to a flow chart shown in FIG. 12, a process of steps 601 to 606 is same as that of the steps 501 to 506 shown in FIG. 10 and will not, therefore, be explained further.

The step 606 discriminates whether the auto focusing mode or the manual focusing mode is selected, and, in case of the manual focusing mode, a step 607 discriminates whether the moving time for the focusing lens 105, to be determined in a step 610, has elapsed. Then the sequence proceeds to a step 608 or 611 respectively if the step 607 identifies that said moving time has elapsed or not.

The step 608 discriminates, as in the step 603, whether there has been a change in the zone in which the zooming lens 102 is positioned, and the sequence proceeds to a step 610 or 609 respectively if there has been a change or not.

The step 610 calculates the moving time for the focusing lens 105, based on the position of the focusing lens 105, memorized in the microcomputer 119 in the step 604, and a predetermined moving time T' of the focusing lens 105 (moving time determining means).

Figure 13:
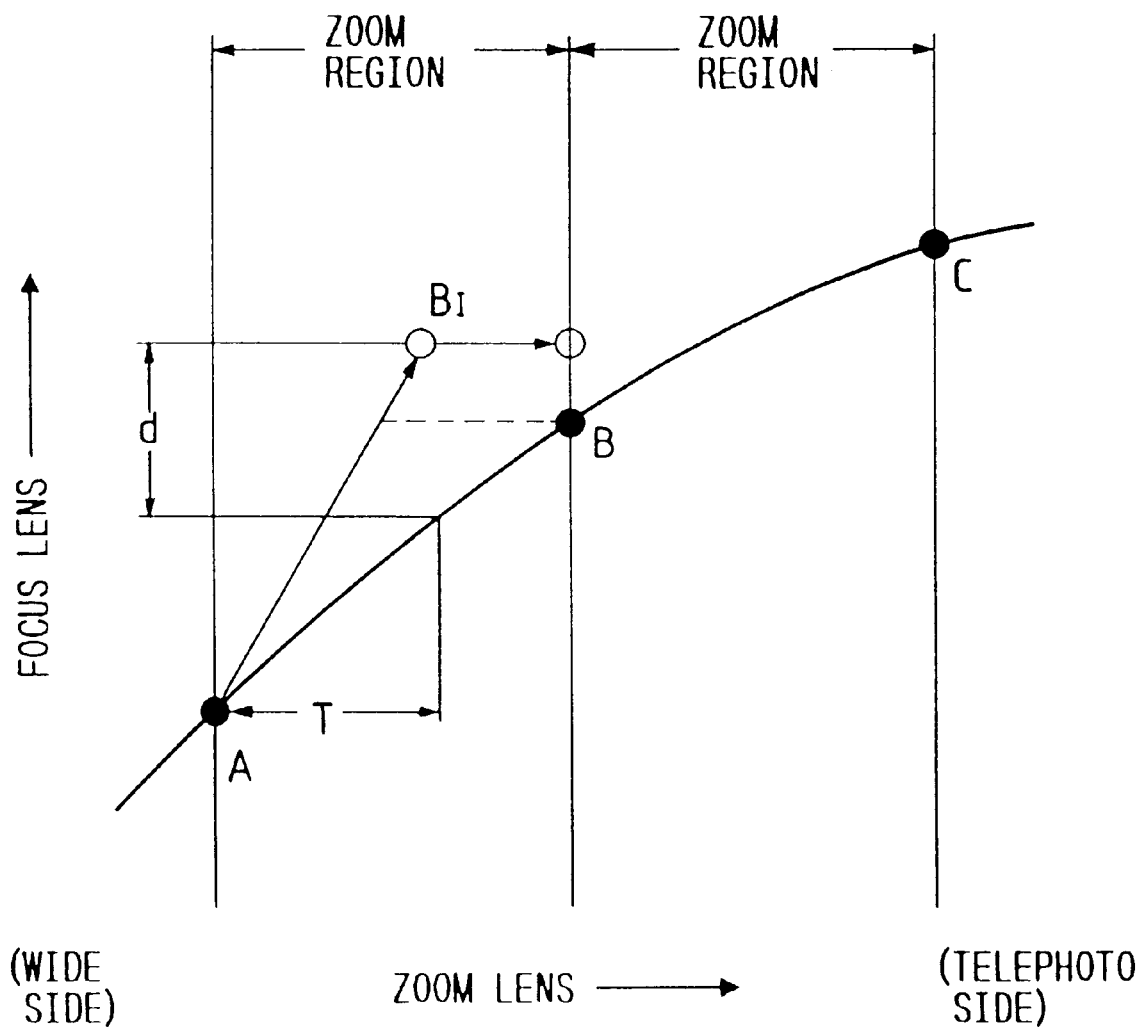
FIG. 13 is a view showing the function of the sixth embodiment.

FIG. 13 shows the method of calculating the moving time for the focusing lens 105, wherein black dots indicate the positions of the focusing lens 105 memorized in the microcomputer 119 by the step 604 shown in FIG. 12, corresponding to the transitions of the zooming lens 102 between the zoom zones. In the course of movement of the zooming lens toward the telephoto side in a zooming operation, if the focusing lens 105 is positioned at A, corresponding to a transition of the zooming lens 102 between the zones, the moving time T' of the focusing lens 105 at this point can be given by:

$$T'=(B-A)/(\text{focusing lens moving speed})$$

wherein B is the memorized position of the focusing lens 105 at the next transition of the zooming lens between the zones.

Said moving speed of the focusing lens 105 is predetermined at a constant speed with which the focusing lens 105 can reach the next memorized position while the zooming lens 102 passes through a zoom zone.

The focusing lens 105 is moved for thus calculated time T, and, upon arriving at the position B1, it is stopped until the next transition between the zoom zones.

At said next transition between the zones, the moving time T is calculated anew from the position B1 and a memorized position C of the focusing lens 105 at the next transition of the zones, and the focusing lens is moved again for thus calculated time T.

After a step 610 in FIG. 13 calculates the moving time T for the focusing lens 105, a step 611 starts the movement of the focusing lens 105, and the sequence returns to the step 601.

If the step 607 identifies that the moving time for the focusing lens 105 has not elapsed, a step 611 continues the movement of the focusing lens 105 and the sequence returns to the step 601.

Also if the step 608 identifies the absence of change in the zone, the focusing lens 105 is stopped and the sequence returns to the step 602.

In the course of the zooming operation toward the telephoto side with the manual focusing mode, the above-explained process is repeated to trace the positions of the focusing lens 105, memorized in a zooming operation toward the wide angle side. Thus it is rendered possible to effect the zooming operation toward the telephoto side, while maintaining the in-focus state in the manual focusing mode.

The above-explained method involves an error d at maximum from the positions traced in the zooming operation toward the wide angle side, as shown in FIG. 13, thus generating a corresponding defocus, but such defocus is scarcely felt in practice, because said defocus is generated only during a very short time.

As explained in the foregoing, the lens control device of the present invention memorizes the trajectory tracked by the focusing means in the course of a zooming operation from the telephoto side to the wide angle side, and inversely tracks the memorized positions of the focusing lens in a zooming operation from the wide angle side to the telephoto side with the manual focusing mode, thereby enabling, for example in a video camera system of inner focus type, a zooming operation toward the telephoto side, while maintaining the in-focus state in the manual focusing mode.

In the following there will be explained a seventh embodiment of the present invention.

The present embodiment has a function of forcedly driving the focusing lens, in the course of a zooming operation, for an object which is difficult to handle with an automatic focusing device, based on the memorized information on the lens position or lens driving speed, and enables such control based on the memorized information only in case the in-focus state is reached prior to the zooming operation, thereby preventing the increase in defocus by an erroneous operation.

As shown in FIG. 3, the moving range (abscissa) of the zooming lens 102 is divided into 16 equal zones, and lens driving speeds Z1–Z16 are assigned respectively to said zones.

The curves of FIG. 2, if considered in each of said zoom zones, can be divided into portions in each of which the inclination of said curves can be considered substantially identical. For a constant driving speed of the zooming lens, if the speed or inclination of the focusing lens within each zoom zone is same, the focusing lens 105 can be moved with a same speed for different object distances. Therefore, as shown in FIG. 3 each zoom zone is divided into portions by the inclination of the curves, along the vertical direction, and a representative driving speed is assigned in each portion, as indicated by Z1–Z16.

Thus, if the lens is focused at the start of zooming, it is rendered possible to cause the focusing lens 105 to follow the trajectory shown in FIG. 2 with an appropriate moving speed, by detecting the positions of the zooming lens and the focusing lens thereby determining the standard moving speed of said focusing lens, and applying correction by the focusing information from the auto focusing device. This situation was already explained before.

However, let us consider a situation where the zooming lens 102 is positioned at the wide angle end in FIG. 3 and the focusing lens 105 is located close to a position P for focusing to an object at infinity. As will be apparent from FIG. 3, the cam trajectories for different object distances at the wide angle end are concentrated around a point A, and the focusing lens positions for infinity and for 3 meters may be contained in the depth of focus, depending on the lens and on the diaphragm aperture. In the passive automatic focusing device mentioned before, if the focusing lens position is contained in the depth of focus, the focusing lens may stop at a focusing position for an object distance of 3 m, even when an object at infinite position is being taken. If the zooming operation is conducted from the wide angle side to the telephoto side from a lens situation in which the lens is identified to be focused to an object distance different from the actual object distance, the lens continues to trace a wrong trajectory and eventually becomes positioned out of the depth of focus, thus generating a larger defocus, as the trajectories corresponding to different object distances diverge. Particularly for the object of low contrast, which is difficult to handle with the passive automatic focusing device, such as a night scene, a foggy distant landscape or a ground scene viewed from an aeroplane, the correction for defocus in the course of the zooming operation often becomes erroneous, so that it has almost been impossible to effect a zooming operation without defocus for such scene.

For this reason, the present applicant already proposed a method of providing, in a zooming operation for such difficult object, the focusing lens with a forced speed for tracking the cam trajectory corresponding to the distance of said object. If the lens can be considered to be in-focus state at the start of the zooming operation, this method allows to effect the zooming operation for the object at said distance, maintaining the amount of defocus at said start.

However, this method is capable of the zooming operation without defocus only if the lens is in-focus at the start of said zooming operation, so that this method necessitates the focusing for example manually, prior to the zooming operation.

The present embodiment, for resolving the above-mentioned drawback, provides a lens control device comprising a first lens group for zooming; a second lens group for focusing; focus detection means for detecting the focus state; first zooming means for correcting the displacement in the focal plane, resulting from the movement of said first lens group, by controlling said second lens group according to a characteristic curve thereof matching the object distance and the output of said focus detection means, thereby effecting a zooming operation while maintaining the in-focus state; second zooming means for controlling said second lens group, in the course of the movement of said first lens group, according to a characteristic curve allowing the zooming operation while maintaining the in-focus state for a particular object distance; switch means for selectively switching said first and second zooming means; and control means for enabling the switching from said first zooming means to said second zooming means when said second lens group is in a position substantially focused to said particular object distance.

Thus, in switching to an operation to track a specified cam trajectory for an object prone to generate defocus, without correction by the auto focusing device, there is automatically discriminated whether the lens is focused to the object, and said switching is executed only in the in-focus state. If out of focus, said switching is not executed but an alarm is given to the operator. Thus the priority is given to the focusing, before the focus is fixed.

The circuit configuration of the present embodiment is same as that of the video camera system shown in FIG. 4. It is also same as that in the foregoing embodiments in that the system control circuit 119 controls the trajectory tracking operation by the zooming lens and the focusing lens as shown in FIG. 2, that the speed information shown in FIG. 3 is stored in the form of a table in said system control circuit 119, and that the trajectory to be traced and the driving speed of the focusing lens are determined from said table, based on the positions of the focusing lens and the zooming lens.

Figure 17:
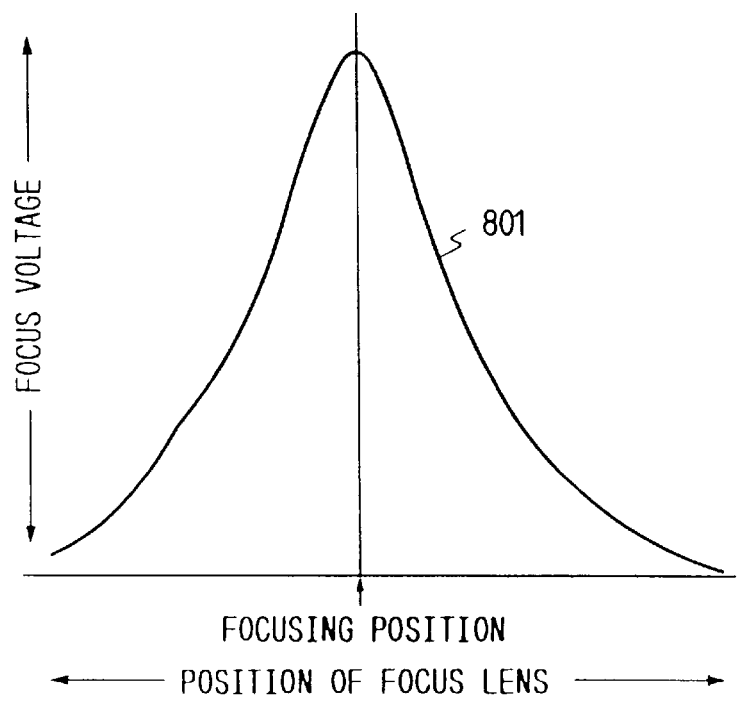
FIG. 17 is a chart showing the automatic focusing operation.

In the present embodiment, the system control circuit 119 also controls the focusing lens for automatic focusing, by detecting the level of high frequency components of the image signal, from the output signal of the band-pass filter 117, and driving the focusing lens 105 through the driver 112 and the actuator 109 so as to maximize said level. FIG. 17 shows the output signal level of said band-pass filter, or so-called focus voltage, as a function of the position of the focusing lens. Said voltage 801, assuming the maximum value at the in-focus point, allows to identify various states such as the in-focus state, out-of-focus state, front-focused state or rear-focused state.

Consequently the above-explained automatic focusing algorithm allows to identify these states even in the course of a zooming operation.

Figure 14:
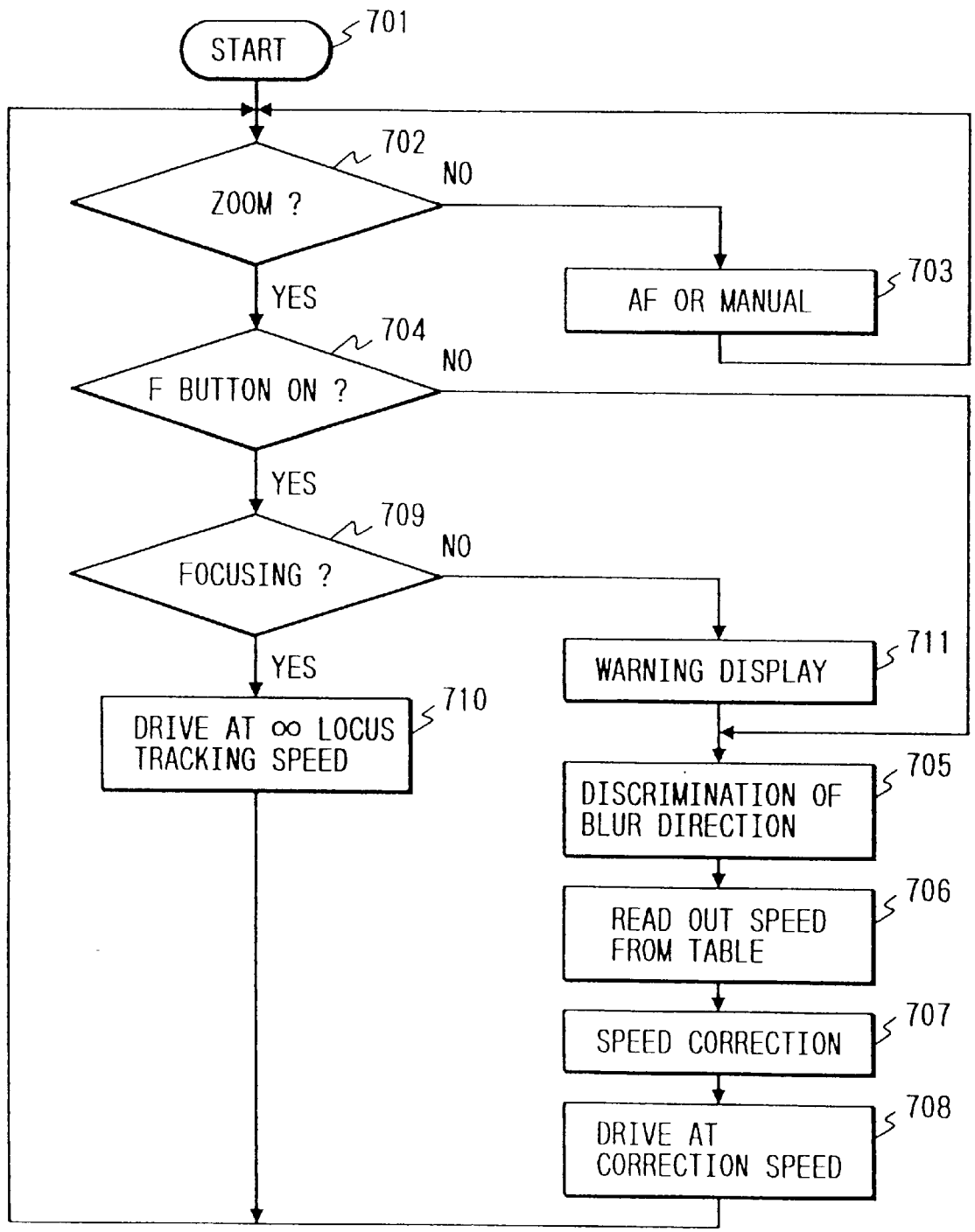
FIG. 14 is a flow chart showing the function of a seventh embodiment of the present invention.

FIG. 14 is a flow chart showing the control sequence of the lens microcomputer 119.

In the present embodiment, the switching from a zooming state corresponding to the first zooming means, for correcting the aberration of the focusing lens from a cam trajectory according to the front/rear focus information from the automatic focusing device in the course of a zooming operation, to another zooming state corresponding to the second zooming means, for causing the focusing lens to forcedly follow a specified cam trajectory without relying on the output of said automatic focusing device, is achieved by the actuation of an infinity direction button (F button) of the manual focus switch 121, used for driving the focusing lens 105 toward the infinite object distance. Although the use of said F button is not essential, it is quite reasonable because the second zooming means not utilizing the automatic focusing device is so constructed as to control the focusing lens along a cam trajectory corresponding to the infinite object distance, as will be explained later.

Referring to FIG. 14, when the sequence is started in a step 701, a step 702 discriminates whether the zoom switch 121 has been actuated, and, if not, a step 703 moves the focusing lens to the in-focus position, by ordinary automatic or manual focusing. After the focusing lens is brought to the in-focus position in the step 703, if the step 702 identifies that the zoom switch 121 has been actuated to effect the zooming operation in either direction, a step 704 confirms the state of the infinity direction button (F button) of the manual focus switch 120 shown in FIG. 1, used for driving the focusing lens 105 toward the infinite object distance. If said F button is not depressed, steps 705 to 708 are executed to drive the focusing lens in the course of zooming operation, referring to the table shown in FIG. 3 and reading the driving speed for the focusing lens, corresponding to the positions of the zooming lens and the focusing lens.

In greater details, the step 705 discriminates the direction of focus (front or rear focus), then the step 706 reads, from the reference table shown in FIG. 3, the driving speed for the focusing lens corresponding to the positions of the zooming lens and the focusing lens, then the step 707 corrects the driving speed, read from the table, in such a direction as to cancel the defocus, and the step 708 drives the focusing lens with the driving speed corrected in the step 707.

Figure 15:
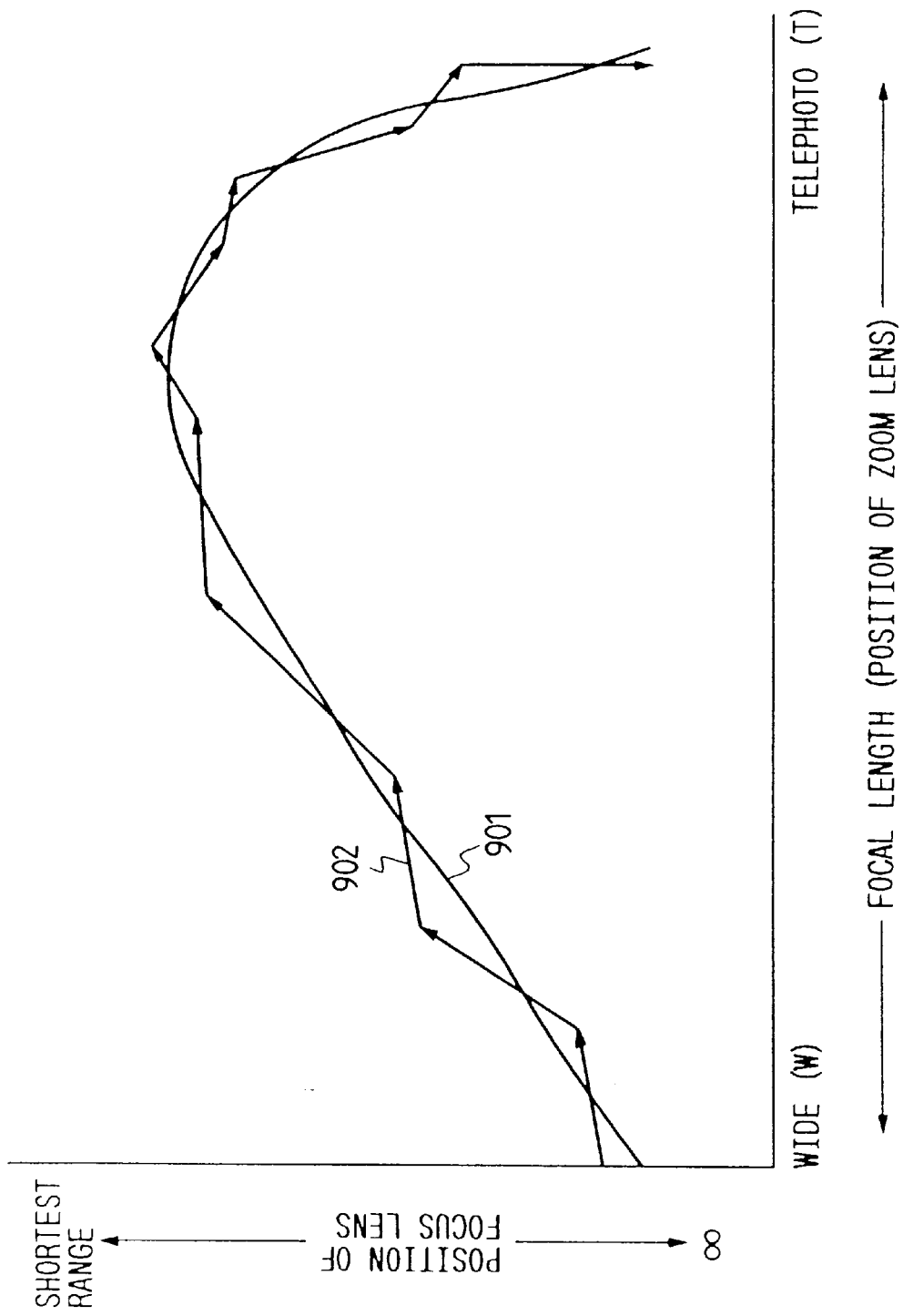
FIG. 15 is a chart showing the function of the seventh embodiment.
Figure 16:
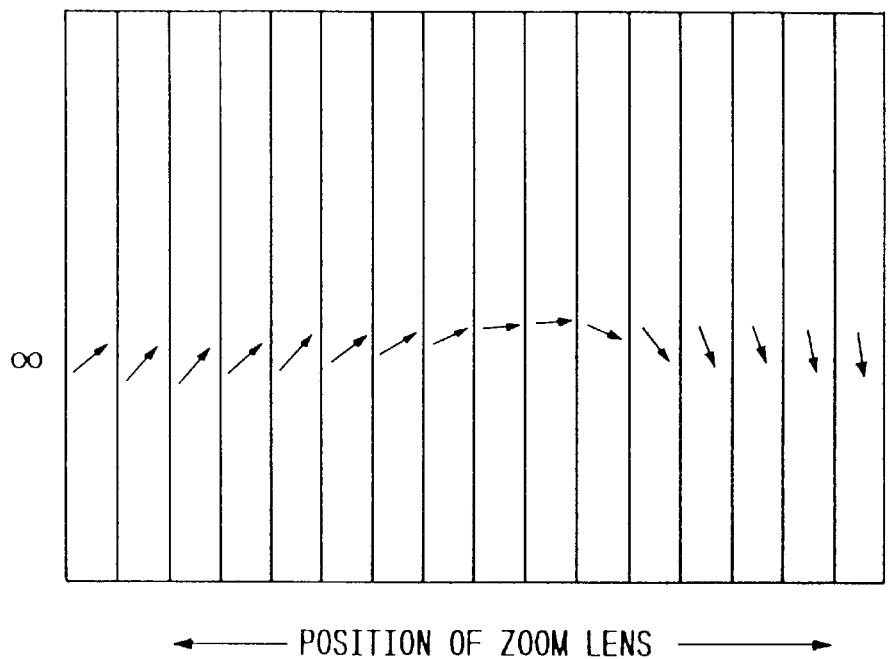
FIG. 16 is a chart showing the function of the seventh embodiment.

FIG. 15 shows the behaviors in the above-explained process, wherein 901 indicates a cam trajectory corresponding to a certain object distance, selected from the trajectories shown in FIG. 2, and 902 indicates the actual trajectory followed by the focusing lens, which is driven, in the course of the zooming operation, with the correction for the front or rear focus on the standard driving speed.

In case the driving speed of the focusing lens is controlled as shown by 902, particularly in a zooming operation from the wide angle side to the telephoto side, a defocus is apt to be generated as already explained in the drawbacks of the prior art, because the control method for the focusing lens as indicated by 902 is based on the reference to the data of the table shown in FIG. 3. Therefore, the amount of defocus increases rapidly, once there is a mistake in the identification of direction of defocus in the step 705 and erroneous data are picked up in the course of the zooming operation.

Such mistake is often encountered in an object of low contrast or an object of an extremely high luminance in comparison with the background. For example, foggy distant mountains or a ground scene or sky taken from an airplane window generally constitutes an object of low contrast, and a night scene often constitutes an object of high luminance. It is to be noted that these objects are all at the infinite distance.

In case a satisfactory zooming operation without defocus cannot be achieved for these objects, the operator depresses the F button in the course of the zooming operation. When said depression is detected by the step 704, the sequence proceeds to the step 709 for discriminating whether the focusing lens in the in-focus position. Said discrimination can be made by judging whether the focus voltage is at the maximum. Since the output signal level of the band-pass filter 117 shows a change in the form of a curve 801 in FIG. 17, depending on the position of the focusing lens, it is possible to identify whether the focusing lens is positioned close to the in-focus position, by detecting whether said output signal level is at the maximum.

When the in-focus position is identified in the step 709, a step 710 effects the zooming operation by providing the focusing lens with a driving speed for tracking the trajectory corresponding to the infinite object distance. This is achieved by converting the driving speed table shown in FIG. 3 to a cam trajectory corresponding to the infinite object distance and controlling the focusing lens strictly along said trajectory. By the switching to a state of providing a driving speed allowing to trace the trajectory of the infinite object distance, as shown in FIG. 3, it is possible to avoid the tracking of an erroneous trajectory, for example by an error in the automatic focusing device.

In the inner focus lens configuration employed in the present embodiment, since the zooming lens is positioned closer than the focusing lens to the object, the amount of defocus (or the sensitivity) varies scarcely by the focal length. Consequently, in case of forcedly giving a speed for tracking the cam trajectory corresponding to the infinite object distance as in the present embodiment, the amount of defocus is maintained throughout the zooming operation unless the lens is in the in-focus state at the start of said zooming operation. For this reason, in the present embodiment, the step 709 judges the focus state, and, only after the in-focus state is confirmed, the sequence proceeds to the step 710 for automatically selecting the tracking speed for the trajectory of the infinite object distance, thereby forcing the focusing lens to trace said trajectory. In this manner a satisfactory zooming operation for the infinite distance, regardless whether the object is difficult to handle with the auto focusing device.

In case the step 709 identifies that the infocus state has not been reached, the sequence proceeds to a step 711 for disregarding the instruction made for example by the depression of the F button in the step 704 and giving a warning to the operator to that effect. Thereafter the sequence proceeds to the process of the steps 705 to 708 for correcting the cam trajectory corresponding to the object distance, by means of the output of the automatic focusing device, as explained before. Thus, in this case, there is searched the focusing lens position matching the infinite object distance, and, after the focusing is attained, the sequence proceeds to the steps 704 and 709.

In another application of the sequence shown in FIG. 14, the operator may focus the lens to the object in the step 703 and then effect the zooming operation while depressing the F button. This procedure can be regarded as focusing to the difficult object manually prior to the start of zooming operation and effecting the zooming operation according to the infinite distance trajectory without the help of the automatic focusing device, so that the lens control can be achieved without any help of the automatic focusing device.

In the so-called inner focus lens system explained above, since the focusing lens is positioned closer than the zooming lens to the image sensor, the sensitivity of the focusing lens position varies scarcely, as a function of the focal length. Consequently, in a zooming operation, if the lens is focused within the depth of focus at the starting point, it is possible to following a fixed cam trajectory, maintaining the amount of defocus at the start, namely without increasing the defocus. This fact is already confirmed experimentally by the present inventors.

In the foregoing description of the drawbacks of the prior art, it was mentioned that a zooming operation from the wide angle side to the telephoto side would generate a defocus if it was started from a position focused to another object distance within the depth of focus. However this is a phenomenon caused by erroneous selection of a cam trajectory along plural ones stored in the table as shown in FIG. 3, and is not contradictory to the present embodiment.

As explained in the foregoing, in case of the zooming operation particularly from the wide angle side to the telephoto side for an object at an infinite or nearly infinite distance, a satisfactory zooming operation can be achieved regardless whether said object is difficult to handle or not, by selecting the infinite-distance zooming mode through the above-explained operations.

As explained in the foregoing, the lens control device of the present invention usually employs a zooming method of selecting one of plural cam trajectories respectively corresponding to plural object distances, but, in case of taking an object which is difficult to handle by the automatic focusing device, said lens control device avoids the use of poorly reliable result of said automatic focusing device. In such case, it executes a forced lens control corresponding to a predetermined object distance and confirms whether the lens is in the in-focus state, prior to the start of said forced lens control, whereby a satisfactory zooming operation without defocus can be conducted to the object intended by the operator, without the influence by the erroneous function of the automatic focusing device.

What is claimed is:

1. A lens control apparatus comprising:
   (a) a variator lens;
   (b) a focus lens for correcting deviation from an in-focus position, caused by movement of said variator lens;
   (c) focus detection means for detecting a focusing state;
   (d) position detection means for detecting positions of said focus lens and said variator lens;
   (e) storing means for storing a plurality of locus information of positions of said focus lens, at which the in-focus state is maintained during the movement of said variator lens; and
   (f) control means for controlling said focus lens so as to drive said focus lens according to the locus information determined on the basis of a position of said variator lens and said focus lens detected by said position detection means, and an output of said focus detection means, in the case that said variator lens is moved from a telephoto side to a wide side, and to drive said focus lens without using the output of said focus detection means, in the case that said variator lens is moved from the wide side to the telephoto side.

2. An apparatus according to claim 1, wherein said focus detection means detects the focusing state based on a predetermined frequency component of a video signal.

3. An apparatus according to claim 1, wherein the locus information is a position information of said focus lens.

4. An apparatus according to claim 1, wherein the locus information is driving speed information of said focus lens.

5. An apparatus according to claim 1, wherein when said variator lens is moved from the wide side to the telephoto side, the last-used locus information is used to move said focus lens.

6. A lens control apparatus comprising:
   (a) a variator lens;
   (b) a focus lens for correcting deviation from an in-focus position, caused by movement of said variator lens;
   (c) an operation member for driving said focus lens;
   (d) position detection means for detecting positions of said variator lens and said focus lens;
   (e) storing means for storing a plurality of locus information of positions of said focus lens, at which the in-focus state is maintained during the movement of said variator lens; and
   (f) control means for controlling said focus lens so as to, during the movement of said variator lens, drive said focus lens according to the locus information determined on the basis of the positions of said variator lens and said focus lens detected by said position detection means and make an operation of said operation member invalid.

7. An apparatus according to claim 6, wherein said operation member is a manual focus button.

8. An apparatus according to claim 6, wherein the locus information is position information of said focus lens.

9. An apparatus according to claim 6, wherein the locus information is driving speed information of said focus lens.

10. An apparatus according to claim 6, wherein when said magnification lens is moved from a wide side to a telephoto side, said control means uses the last-used locus information to move said focus lens.

11. A camera apparatus comprising:
    (a) a variator lens;
    (b) a focus lens for correcting deviation from an in-focus position, caused by movement of said variator lens;
    (c) manual focus means for manually controlling to drive said focus lens;
    (d) position detection means for detecting positions of said variator lens and said focus lens;
    (e) storing means for storing a plurality of locus information of positions of said focus lens, at which the in-focus state is maintained during the movement of said variator lens; and
    (f) control means for controlling said focus lens so as to, during the movement of said variator lens, drive said focus lens according to the locus information determined on the basis of the positions of said variator lens and said focus lens detected by said position detection means and inhibit an operation of said manual focus means.

12. An apparatus according to claim 11, wherein said manual focus means includes a manual focus button.

13. An apparatus according to claim 11, wherein the locus information is position information of said focus lens.

14. An apparatus according to claim 11, wherein the locus information is driving speed information of said focus lens.

15. An apparatus according to claim 11, wherein when said variator lens is moved from a wide side to a telephoto side, said control means controls to drive said focus lens according to the last-used locus information.

16. A lens control apparatus comprising:
    (a) a variator lens;
    (b) a focus lens for correcting deviation from an in-focus position, caused by movement of said variator lens;
    (c) position detection means for detecting positions of said focus lens and said variator lens;
    (d) storing means for storing a plurality of locus information of positions of said focus lens, at which the in-focus state is maintained during the movement of said variator lens; and
    (e) control means for controlling said focus lens so as to drive, in an auto-focusing mode, said focus lens according to the locus information determined on the basis of the positions of said variator lens and said focus lens detected by said position detection means, and drive, in manual focusing mode, said focus lens according to the last used locus information to move said focus lens.

17. An apparatus according to claim 16, further comprising focus detection means for detecting the focusing state based on a predetermined frequency component of a video signal.

18. An apparatus according to claim 16, wherein the locus information is a position information of said focus lens.

19. An apparatus according to claim 16, wherein the locus information is driving speed information of said focus lens.

20. An apparatus according to claim 16, wherein the last used locus information is the locus which said focus lens lastly traced during movement of said variator from a telephoto side to a wide side.

21. A lens control method of controlling a variator lens and a focus lens for correcting deviation from an in-focus position, caused by movement of said variator lens, a focus detection step of detecting a focusing state;

a position detection step of detecting positions of said focus lens and said variator lens;

a storing step of storing a plurality of locus information of positions of said focus lens, at which the in-focus state is maintained during the movement of said variator lens; and a control step of driving said focus lens according to the locus information determined in the basis of a position of said variator lens and said focus lens detected by position detection means, and an output of said focus detection means, in the case that said variator lens is moved from a telehoto side to a wide side, and for driving said focus lens without using the output of said focus detection means, in the case that said variator lens is moved from the wide side to the telephoto side.

22. A method according to claim 21, wherein said focus detection step detects the focusing state based on a predetermined frequency component of a video signal.

23. A method according to claim 21, wherein when said variator lens is moved from the wide side to the telephoto side, the last-used focus information is used to move said focus lens.

24. A lens control method of controlling a variator lens and a focus lens for correcting deviation from an in-focus position, caused by movement of said variator lens, comprising:

an operation step of driving said focus lens;

a position detection step of detecting positions of said variator lens and said focus lens;

a storing step of storing a plurality of locus information of positions of said focus lens, at which the in-focus state is maintained during the movement of said variator lens; and a control step of, during the movement of said variator lens, driving said focus lens according to the locus information determined on the basis of the positions of said variator lens and said focus lens detected by said position detection means and ignoring an operation of said operation means.

25. A method according to claim 24, wherein said operation step includes an operation of manual focus button.

26. A method according to claim 24, wherein the locus information is position information of said focus lens.

27. A method according to claim 24, wherein the locus information is driving speed information of said focus lens.

28. A method according to claim 24, wherein said control step includes a step of moving said focus lens by using the last-used locus information to move said focus lens when said magnification lens is moved from a wide side to a telephoto side.

29. A camera controlling method for controlling a variator lens and a focus lens for correcting deviation from an in-focus position, caused by movement of said variator lens, comprising:

a manual focus adjusting step of manually controlling to drive said focus lens;

a position detection step of detecting positions of said variator lens and said focus lens;

a storing step of storing a plurality of locus information of positions of said focus lens, at which the in-focus state is maintained during the movement of said variator lens; and a control step of, during the movement of said variator lens, driving said focus lens according to the locus information determined on the basis of the positions of said variator lens and said focus lens detected by said position detection means and inhibiting an operation of said manual focus means.

30. A method according to claim 29, wherein said manual focus adjusting step includes an operation of a manual focus button.

31. A method according to claim 29, wherein the locus information is position information of said focus lens.

32. A method according to claim 29, wherein the locus information is driving speed information of said focus lens.

33. A method according to claim 29, wherein said control step includes a step of driving said focus lens according to the last used locus information when said variator lens is moved from a wide side to a telephoto side.

* * * * *

UNITED STATES PATENT AND TRADEMARK OFFICE
CERTIFICATE OF CORRECTION

PATENT NO. : 5,949,586

DATED : September 7, 1999

INVENTOR(S) : Masahide Hirasawa, et al.

It is certified that error appears in the above-identified patent and that said Letters Patent are hereby corrected as shown below:

Col. 1, line 14, delete "cam-corders" and insert -- Camcorders --.
Col. 1, line 18, delete "such trend" and insert -- such a trend --.
Col. 1, line 19, before "so-called" insert -- a --.
Col. 1, line 24, before "so-called" insert -- a --.
Col. 5, line 48, delete "are same" and insert -- are the same --.
Col. 6, line 9, delete "form a" and insert -- form of a --.
Col. 6, line 54, delete "the-current" and insert -- the current --.
Col. 8, line 17, delete "in case the" and insert -- in the case where the --.
Col. 8, line 31, delete "in case of" and insert -- in the case of --.
Col. 15, line 2, delete "with-said" and insert -- with said --.

Signed and Sealed this

Seventeenth Day of April, 2001

Attest:

NICHOLAS P. GODICI

*Attesting Officer*       *Acting Director of the United States Patent and Trademark Office*